US006961765B2

(12) United States Patent
Terry

(10) Patent No.: US 6,961,765 B2
(45) Date of Patent: Nov. 1, 2005

(54) SYSTEM AND METHOD FOR REAL TIME MONITORING AND CONTROL OF NETWORKED COMPUTERS

(75) Inventor: Robert F. Terry, Old Hickory, TN (US)

(73) Assignee: BBX Technologies, Inc., Nashville, TN (US)

( * ) Notice: Subject to any disclaimer, the term of this patent is extended or adjusted under 35 U.S.C. 154(b) by 776 days.

(21) Appl. No.: 09/827,891

(22) Filed: Apr. 6, 2001

(65) Prior Publication Data

US 2002/0026505 A1 Feb. 28, 2002

Related U.S. Application Data

(60) Provisional application No. 60/194,895, filed on Apr. 6, 2000.

(51) Int. Cl.[7] ............................................. G06F 15/173
(52) U.S. Cl. ...................... 709/224; 709/218; 709/246; 713/201
(58) Field of Search ................................ 709/217, 218, 709/219, 246, 223, 224; 713/201; 714/2

(56) References Cited

U.S. PATENT DOCUMENTS

| | | | |
|---|---|---|---|
| 5,475,839 A | | 12/1995 | Watson et al. |
| 5,606,604 A | * | 2/1997 | Rosenblatt et al. ......... 379/198 |
| 5,790,397 A | | 8/1998 | Bissett et al. |
| 5,809,230 A | | 9/1998 | Pereira |
| 5,903,778 A | | 5/1999 | Chang |
| 5,919,258 A | | 7/1999 | Kayashima et al. |
| 5,991,881 A | * | 11/1999 | Conklin et al. ............. 713/201 |
| 6,032,201 A | | 2/2000 | Tillery, Jr. et al. |

FOREIGN PATENT DOCUMENTS

| | | |
|---|---|---|
| EP | 0 772 127 A1 | 7/1997 |
| WO | WO PCT/US95/04109 A1 | 10/1995 |
| WO | WO PCT/IL98/00170 A2 | 10/1998 |
| WO | WO PCT/US98/26863 A2 | 6/1999 |
| WO | WO PCT/US99/00481 A1 | 7/1999 |
| WO | WO 00/07099 | 2/2000 |
| WO | WO PCT/US99/15352 A1 | 2/2000 |
| WO | WO PCT/US99/24801 A3 | 4/2000 |
| WO | WO PCT/US99/24801 A2 | 4/2000 |
| WO | WO PCT/GB00/02082 A1 | 12/2000 |

OTHER PUBLICATIONS

"Mechanism For Trusted Computing Base Definition And Checking", IBM Technical Disclosure Bulletin; Feb. 1992, pp. 188–191, vol. 34 No. 9; IBM Corp., Armonk, NY, USA.
William Wong, "Remote–Control Registry", Review XP–001041962; BYTE, May 1998, total pp. :4 (3 sheets).
"Getting to Know Windows 95 with Regmon", Windows Professional, Jan. 1999, Retrieve from the Internet: <URL:http://msdn.microsoft.com/library/default.asp?url=/library/en–us/dnwinpro99/html/w9p9914.asp>.
"Selecting audit events for Windows NT 4.0 registry key", Carnegie Mellon Software Engineering Institute, Cert Coordination Center, Mar. 17, 1999, Retrieved from the Internet <URL:http://www.cert.org/security–improvement/implementations/i028.04html>.
Remote Console Session, IBM Technical Disclosure Bulletin, IBM Corporation 1993, vol. 36 No. 08 Aug. 1993, pp. 93–97, Armonk, NY, US.

* cited by examiner

*Primary Examiner*—Frantz B. Jean
(74) *Attorney, Agent, or Firm*—Arnold M. de Guzman

(57) ABSTRACT

A method of real time monitoring and control of networked computers, includes: providing a monitoring computer unit and client computer unit both capable of being communicatively coupled to a network system; and detecting states in the client computer and transmitting the detected states to the monitoring computer unit via the network system.

20 Claims, 24 Drawing Sheets

Structured Signal File Block Diagram

SYSTEM AND METHOD FOR REAL TIME MONITORING AND CONTROL OF NETWORKED COMPUTERS

CROSS-REFERENCE TO RELATED APPLICATION

This application claims priority to U.S. Provisional Application No. 60/194,895, by Robert F. Terry, filed Apr. 6, 2000, and entitled "PC MACHINE ENVIRONMENT AND CONFIGURATION PROFILE REAL TIME MONITORING AND CONTROL BY ACTIVE MEMORY WINDOW HANDLES, WINDOW MESSAGING AND DIRECTORY/FILE/REGISTRY MAPPING". Application No. 60/194,895 is fully incorporated herein by reference.

FIELD OF THE INVENTION

The present invention relates generally to the field of utility (operating system) application programming, and more particularly but not exclusively, to systems and methods for the real-time monitoring, recording and/or controlling the internal environment of a computer unit such as the activity within a personal computer (PC) machine.

BACKGROUND OF THE INVENTION

As the use of technology expands in businesses and organizations, there is an increasing need for management personnel to effectively track and control the internal PC machine activity (environment) of company owned technology.

For example, a PC has an internal operating system (O/S), which is initiated at the time the PC "boots" from its internal hard drive. This O/S includes a series of hundreds of programs, which manage all third-party application (program) activity and all user activity. Every action (event), that an end user performs, creates an internal reaction (another event) internal to the O/S to carry out the user's request. Every action (event), that a third-party program initiates, creates an internal reaction (another event) internal to the O/S to carry out the program's request and at times, modifies the internal O/S environment (structure) of the computer unit.

One of the most critical aspects of a PC O/S and all third-party applications is the start-up phase of the O/S and all third party applications. This start-up phase includes critical files and/or registry entries, which are read by certain internal programs relative to the O/S and third-party applications, which guide the O/S and third-party applications as to what is "required" at the time of O/S "boot up" or third-party application (program) execution.

These critical files and registry entries are considered to be "soft tables", which allow modification so that an O/S or third-party application can have their internal operating environment modified to fit the specific needs of the computer unit and end-user.

These critical files and registry entries are so flexible, that it is possible to initiate computer programs, unknown to the end-user, which can significantly modify, collect, report, initiate a task or destroy information on a computer unit.

The registry entries are those part of the O/S which defines and initiates a new program which can occur automatically without the knowledge of the user. The registry acts as a "guide" to the actual O/S. When certain defined elements of a program are written to specific parts of the registry, the O/S will start the program automatically without notification to the user.

Based on the technological advances of the Internet and the ability to automatically transfer data from one computer unit to another computer unit in a compressed format, it is possible to "disguise" programs in the form of common data, which initiates on a computer unit that modifies a critical O/S or third-party application start-up file or load to the registry, which in turn, initiates an unknown program which collects, reports, initiates a task or destroys information on a computer unit.

All these possibilities can occur, without the knowledge of the end-user or any individuals within a business or organization.

Accordingly, there is a need for a real-time tracking tool that would permit management to record, monitor and report the internal environment of each computer unit in an efficient, noninvasive manner. Furthermore, there is a need for a real-time tool to automatically "reverse" any unauthorized internal modifications and to report these modifications to management personnel within a business or organization.

SUMMARY

In one embodiment, the present invention provides a method of real time monitoring and control of networked computers, includes: providing a monitoring computer unit and client computer unit both capable of being communicatively coupled to a network system; and detecting states in the client computer and transmitting the detected states to the monitoring computer unit via the network system.

In another embodiment, the present invention provides a real-time method of electronically "mapping" the hard drive the computer unit to record the O/S and third-party application start-up environment, including: (a) analyzing the hard drive for the presence of all critical directories and files; (b) recording the vital statistics of all directory information, number of files, directory size, and other information; (c) recording the vital statistics for each critical file, such as file creation time, last modification time, file size; (d) recording the vital statistics of the computer unit's internal registry.

In another embodiment, the present invention also provides a real-time method of detecting states that are activated by internal computer unit environment, which include: (a) monitoring the active window task manager for all identifiable window handles; (b) intercepting all operating system messages which are transmitted between third-party applications (programs) and the O/S; (c) detecting any change in a critical O/S file or third-party start-up file; (d) detecting any change in a critical aspect of the registry; (e) sending a inner-process communications message to any identifiable window handle which resides within the active task manager; (f) sending a real time forensic report to a monitor station defining the state of the detection.

In another embodiment, the present invention also provides a real-time method of transmitting and storing this vital information to a storage device (monitor station).

In one aspect of the present invention, the recorded and stored data may be transmitted by a client computer unit and received by a second computer unit (monitor station) that allows management to view the current client computer unit's internal operating environment which can be managed and controlled by the second computer unit (monitor station).

Another aspect of the present invention may include the ability to report in a real-time environment to the monitor station, any unknown modification to the critical O/S, registry, or application start-up files by unknown programs and reverse these modifications back to their original state.

Another aspect of the present invention may include the ability to record and analyze a "penetration pattern" of unknown programs, which attempt to significantly modify, collect, report, initiate a task or destroy information on a computer unit.

Another aspect to the present invention may include the ability transmit this "penetration pattern" to the monitor station and analyze the pattern with all additional computer units to determine the best method to stop the automated modifications, which may be executing throughout a local area network (LAN) or a wide area network (WAN).

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

In the description herein, numerous specific details are provided, such as the description of systems, components, methods, and processes, to provide a thorough understanding of embodiments of the invention. One skilled in the relevant art will recognize, however, that the invention can be practiced without one or more of the specific details, or with other methods, components, materials, parts, and the like. In other instances, well-known structures, materials, or operations are not shown or described in detail to avoid obscuring aspects of the invention. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a system and method for the real-time monitoring, recording and/or controlling the internal environment of, for example, an actual personal computer (PC) machine (computer unit) activity, with regards to the active identifiable Window® handles listed within the task manager, window messages processed between all applications (programs) and the operating system, all critical operating system files, registry entries which activate programs and all critical independent application (program) files which control the start-up (initialization) of a computer unit and control the start-up (initialization) of all applications (programs) installed on the computer unit. Although the various embodiments and features of the invention is described in this disclosure in the environment of the Windows operating system, the various embodiments and features of the invention described in this disclosure may be applicable to other applications and are not intended to be necessarily limited to the environment of the Windows operating system.

Figure 1:
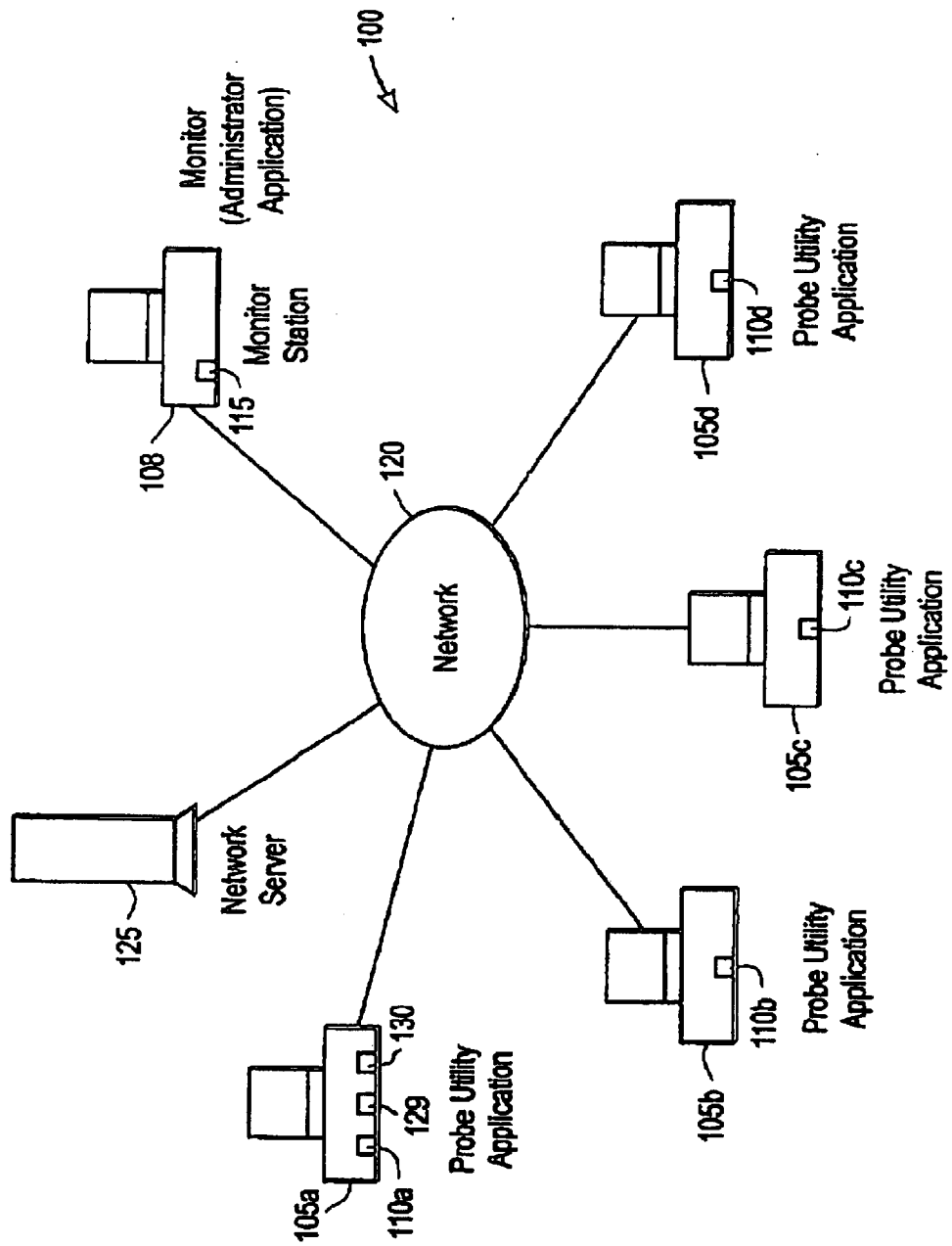
FIG. 1 is a flow diagram of a network system that can implement an embodiment of the present invention.

Referring now to FIG. 1, there is shown an example of a network system that can implement the present invention. In this embodiment, the network system 100 includes a plurality of computer units (or workstations) 105a–105d and 108, and a network server 125. The computer units 105 and 108 may include personal computers, workstations, notebook computers, servers, and/or other suitable computing devices. The network server 125 may also be implement as, for example, a server, a computer unit, workstation, or other suitable devices. As an example, the computer units 105a–105d may each include a client application (probe utility application) 110a–110d, respectively, in accordance with an embodiment of the present invention, while some of the computer units 105 may not include a client application 110. However, any of the computer units 105 in FIG. 1 may or may not be implemented with the client application 110. To assist in explaining the functionalities of various embodiments of the invention, any or all of the computers 105a–105d will be referred to as generally computer 105, while any or all of the client applications 110a–110d will be referred to as generally client application (probe utility application) 110.

Some computer units may include an administrator (monitor) application 115 in accordance with an embodiment of the present invention. In the example of FIG. 1, computer unit (monitor station) 108 includes the administrator application 115. However, any other computer units in FIG. 1 may also be implemented with the administrator (monitor) application 115.

The computer units in FIG. 1 are coupled together by, for example, a wiring hub 120.

A conventional network interface card or LAN adapter (not shown) is typically implemented in each of the computer units in FIG. 1 for operating each computer unit within the network system. A network interface card typically serves as an interface between a given computer unit and the cables in the network system. A network interface card uses a specialized processor and routines to move data between the memory of the given computer unit and the network cable attached to the given computer unit.

In one embodiment, the present invention permits tracking of all internal machine configuration profiles (start-up) in a computer unit 105 having the client application 110. All internal machine activity, or changes in those activities are monitored by the client application 110. The client application 110 co-exists with the operating system of a computer unit 105 and acts as a non-invasive machine activity monitor. As an example, assume the computer unit 105 starts a third-party program 130, and that program activity and its start-up information are monitored in the computer unit 105. The client application 110 in the computer unit 105 will determine each activity state and whether that activity state is normal for daily operations. The client application 110 constantly cycles, comparing the internal configuration profile initially recorded, to its current profile as the computer unit 105 executes.

In one embodiment, the client application 110 is a utility application, which is designed and developed within the Microsoft Visual C++ and in the Microsoft 32 Bit API Environment. The client application 110 accesses the conventional Windows operating system information in two distinct methods; 1) Through a fully reusable C++ library conventionally known as the Microsoft Foundation Class (MFC); or 2) Through a direct interface with operating system native functions called Microsoft Application Programming Interface (API).

The MFC hides the fundamental, (high level) application programming interfaces (API) that a programmer would normally use and provides an abstract development layer that allows a programmer to design/develop a Microsoft Windows multithreaded utility application, without knowing the exact details of each native independent API within the Microsoft Operating System. Otherwise stated, the MFC is a grouping of APIs that make software design and development easier for the programmer.

In programming, as known to those skilled in the art, a thread is a part of a program that can execute independently of other parts. Operating systems that support multithreading enable programmers to design programs whose threaded parts can be executed concurrently by the operating system.

As stated, the MFC is utilized for "high level" operating system functions. For the "lower level" functions, a Microsoft 32 Bit API interface is utilized by invoking the actual Windows operating system native independent functions to retrieve the current operating system machine configuration and activity states.

An overview is now presented on the operation of an embodiment of the administrator application 115. The monitor station (or administrator application) 108 which resides on, for example, a standard computer unit PC or network server, collects and maintains all configuration, forensic data and administrative policies which are implemented throughout the network environment which have the client application 110.

Figure 23:
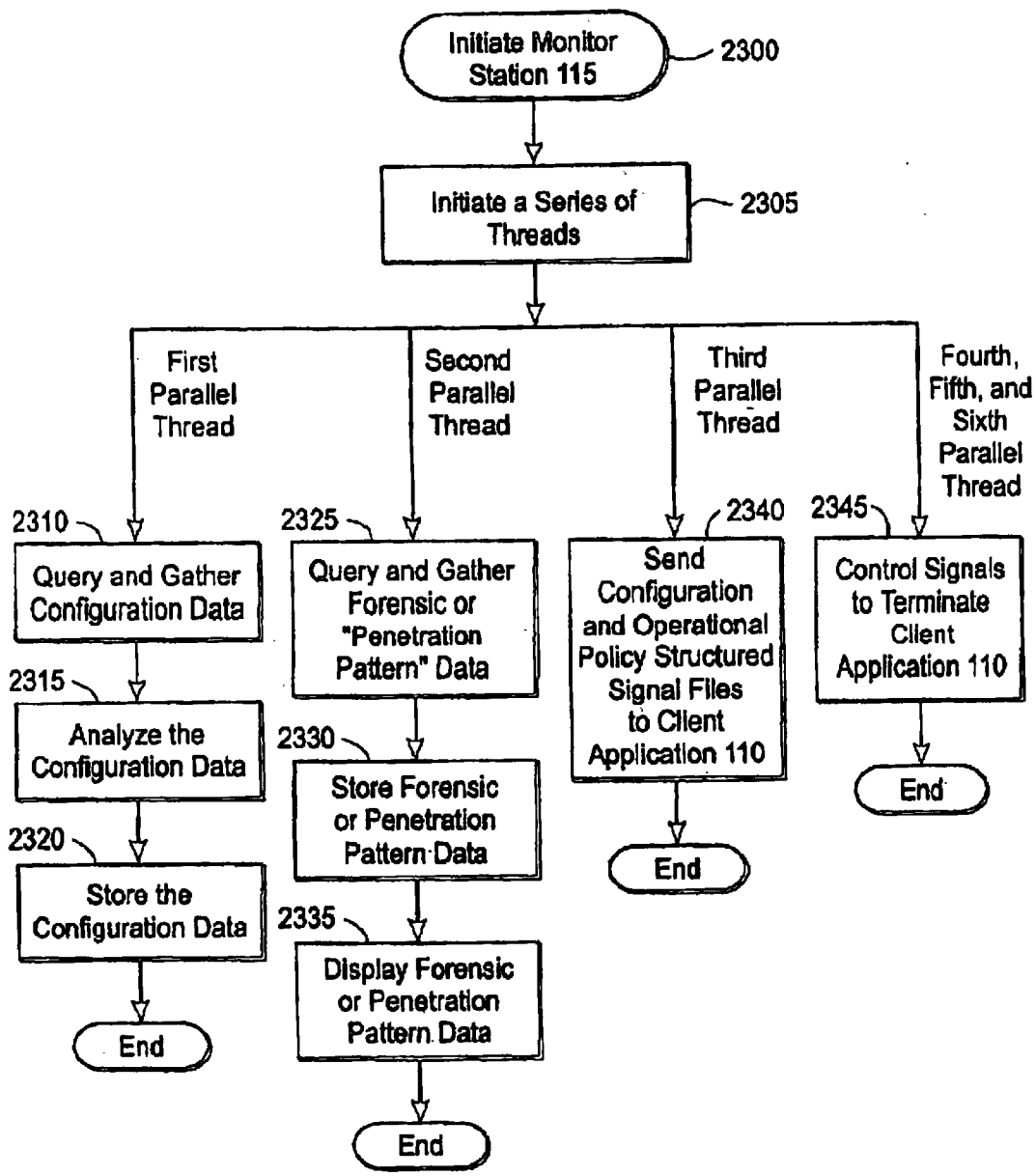
FIG. 23 is a flow diagram illustrating the parallel threads controlled by a main application thread of the monitor station.

As shown in FIG. 23, when the monitor station 115 is initiated, the main application thread initiates a series of sub threads ("parallel threads"), which all are parallel and are controlled by the main application thread. Each parallel thread, which is initiated, is assigned a task to collect and record data relative to the operational environment of each client application 110.

The first parallel thread is assigned to query (2310) the network system 100 for any structured signal files which may contain configuration data on each computer unit 105 which is operating a client application 110. As this first parallel thread gathers configuration data, this thread analyzes (2315) the configuration data and stores (2320) the configuration data at a location local to the administrative application 115. This data is the complete configuration environment of the client application 110 which defines the "electronic footprint" of all O/S files, all "third party" startup data and all computer registry data.

The second parallel thread is assigned to query (2325) the network system 100 for any structured signal files which may contain forensic or "penetration pattern" data on each computer unit 105 which is operating a client application 110. As this second parallel thread is polling the network system 100, if forensic data is transmitted from the client application 110, the administrative application 115 will collect and store (2320) the data, to be displayed (2325) within administrative application 115 as required (selected) by the administrator (or user).

The third parallel thread is assigned to transmit (2340) configuration and operational policy structured signal files to each client application 110 individually or all client applications globally. The thread sends the structured signal file that the administrator (or user) has created and defined as a policy structured signal file and selected to transmit (deploy) the policy via the network system 100.

The fourth, fifth and sixth parallel threads are a series of command and control structured signal files, which are transmitted (deployed) to each client application 110, which terminate (2345) the client application 110 under certain conditions. Each "shut down" or termination signal has a different effect on a client application 110. Once a client application 110 is re-started or initiated, the client application 100 may: (1) Continue its normal activity; (2) Initialize its installation sequence and collect new configuration data on its associated computer unit 105; and/or (3) Remain terminated until such time a "resume" structured signal file is transmitted from the administrative application 115.

The remaining threads and programs (not shown in FIG. 23) within the administrative application 115 perform the routine administrative functions of displaying data, archiving data, and allowing the user to export or erase information as required.

Figure 2:
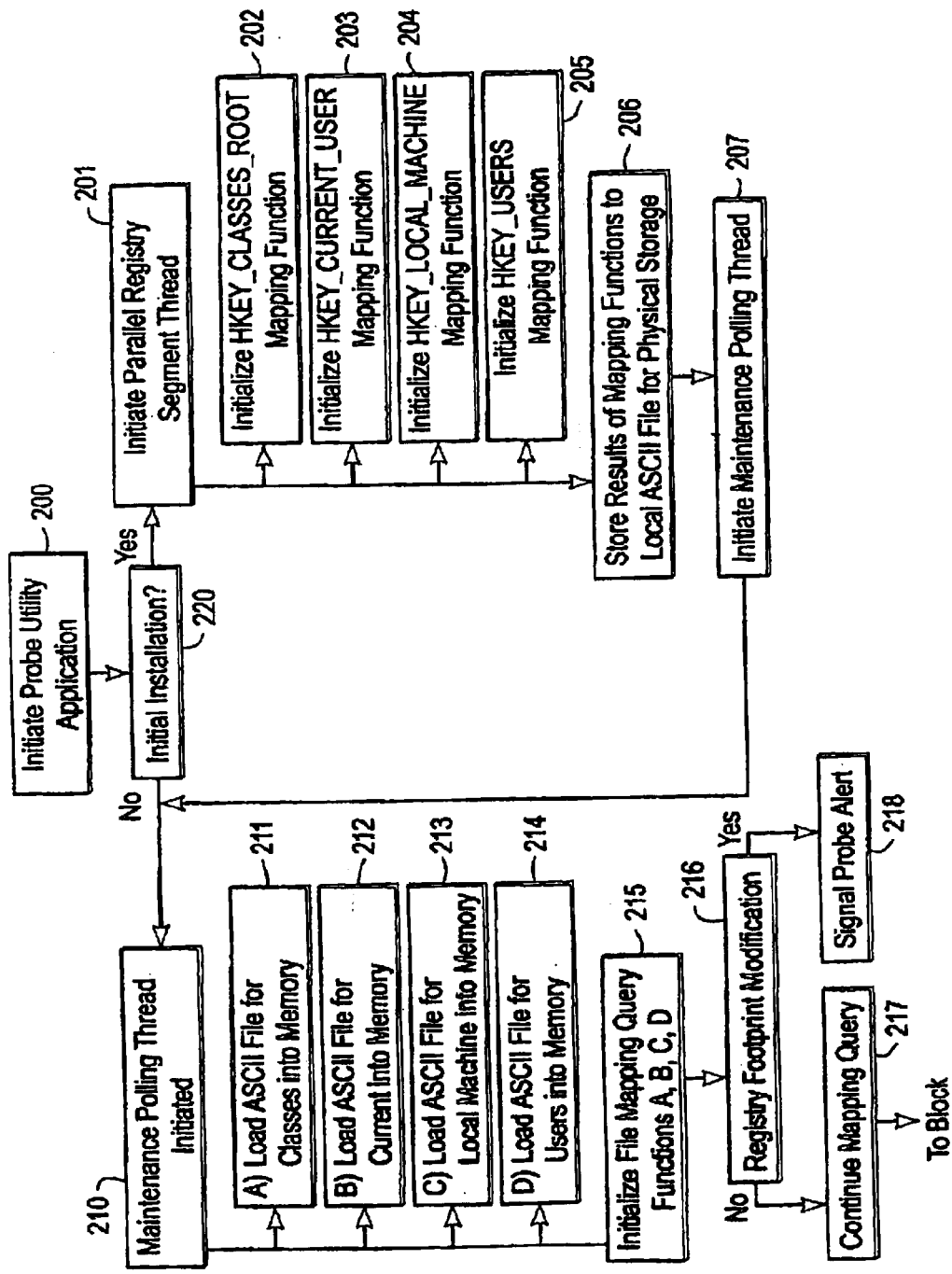
FIG. 2 is a flow diagram of an "electronic mapping" of computer units internal registry information in regards to the start-up "boot up" of a computer unit and the start-up of all third-party applications.

Reference is now made to FIG. 2 for purposes of discussing the functional mechanics of the client application in accordance with an embodiment of the present invention. In particular, FIG. 2 is a flow diagram of the "electronic mapping" of computer units internal registry information in regards to the start-up "boot up" of a computer unit 105 and the start-up of all third-party applications (e.g., third-party application 130 in FIG. 1). It is noted that a third-party application may, for example, be installed by a user in any of the computer units 105 or may be downloaded to any of the computer units 105 from a data network such as the Internet.

Once a client application 110 initiates, the client application 110 executes a series of parallel threads functions which poll querying the operating system for high level information and executing a series of independent 32 bit API DLLs to collect low level information. As known to those skilled in the art, a Dynamic Link Library (DLL) is a library of executable functions or data that can be used by a Windows application. Typically, a DLL provides one or more particular functions and a program accesses the functions by creating either a static or dynamic link to the DLL. A static link remains constant during program execution, while a dynamic link is created by the program as needed. DLLs can also contain just data. The linker automatically looks in libraries for routines that it does not find elsewhere. In MS-Windows environments, library files have a .dll extension.

The high level information which is polled includes the active program memory stack, which lists all of the active programs "handles" which are currently functioning within memory. The active "focus window" "points" to the application in current use by the "end user".

The independent API DLLs which are executed may include the following: GTApprvd.dll, GTclsid.dll, GTCmpNm.dll, GTCUSoft.dll, GTDrvQry.dll, GTKeyBrd.dll, GTKillAp.dll, GTMicrRun.dll, GTRegQry.dll, GTRegSoft.dll, GTRgstry.dll, GTRunExe.dll, GTRunWat.dll, GTShell.dll, GTShellExt.dll, GTShellNme.dll, GTSysMsg.dll, and GTTaskBar.dll.

Each independent DLL is controlled by a high level parallel thread. Examples of low level data (information) which is collected is all registry configuration data, all real time "kernel" system messages processed between the O/S and the third party applications 130 relative to window object, window type, mouse movement, mouse selection and I/O operation. Additional low level data that may be collected may include, key board intercept, registry status (various key segments critical to program initiation), application "command and control signals sent to applications, the program manager and the task bar.

During the initial installation of a client application 110, a parallel threaded function is initiated (block 201) which initiates the 32 Bit API DLL, as described herein and designed and developed by the inventor, and which retrieves all of the internal registry information of a computer unit 105.

An internal machine registry of the computer unit 105 maintains an initialization list for every program utility required to initiate the computer unit 105 properly, in order to execute the basic Windows operating system and all those programs which are required to initialize third-party applications 130.

Some third-party applications 130 require certain programs to be initiated at the time the operating system initially starts, while others only require additional programs at the time the user initiates the third-party application.

In one embodiment, once the computer unit's registry information is retrieved by the client application 110, the registry information stored into memory arrays and is written in a structured ASC file, which is stored within the computer unit 105.

Once all configuration data is collected from the computer unit 105, the data is stored local to the computer unit 105, and the following functions are initiated. A function is initiated which loads all registry CLASS configuration data into memory arrays (block 211). A function is initiated which loads all registry CURRENT (current users) configuration data into memory arrays (block 212). A function is initiated which loads all registry LOCAL MACHINE configuration data into memory arrays (block 213). A function is initiated which loaded all registry USERS configuration data into memory arrays (block 214).

Once all registry data is loaded into memory, a parallel thread initiates (block 215) the series of low level API 32 Bit DLLS, which poll each defined registry segment to determine if any registry data has been modified (block 216).

If the function in block 216, which determines if a registry modification has been made, identifies a modification, then the function reports (alerts) the administrative application 115 by generating and transmitting a structured signal file (block 218). If there has been no registry modification, then polling continues (217) for the defined registry segments by returning to the function in block 215.

In block 218, the structured ASC file can be electronically retrieved from the computer unit 105, to the monitor station 115 for a detailed analysis by the network administrator.

The client application (probe utility application) 110 is indicated as being initiated in block 200. After the initial recording (block 220) of the registry information, the parallel thread (block 210), which commands the independent 32 Bit API DLL designed and developed by the inventor, initiates a series of sub-functions (as described above in blocks 211 through 218) which then monitor all registry information for real-time changes within the computer unit 105 environment.

If a program initiates which modifies any of the internal registry environment, then an internal message is generated from the client application 110 to the computer unit's main screen, alerting the end-user and generating (transmitting) a signal to the monitor station.

If the registry modification is an unauthorized change unknown to the user and/or network administration, the internal registry information, which was modified, is then reversed back to its original state.

The configuration files, which are stored within the computer unit 105, maintain the defined configuration of the computer unit 105. When a modification occurs, the client application 110 refers to the stored configuration data and will restore the computer unit 105 back to its original state that was recorded prior to the unauthorized modification. The characteristics of the change are then recorded in a structured ASC file and are logged as a penetration pattern. The computer unit 105 then generates (transmits) this penetration pattern file to the monitor station 115 for further comparison analysis by the monitor station. The comparison analysis initiated by the monitor station, is a series of parallel threaded functions, which compare all penetration patterns received from all computer units 105 (client applications 110), which transmit information to the monitor station 115.

Figure 24:
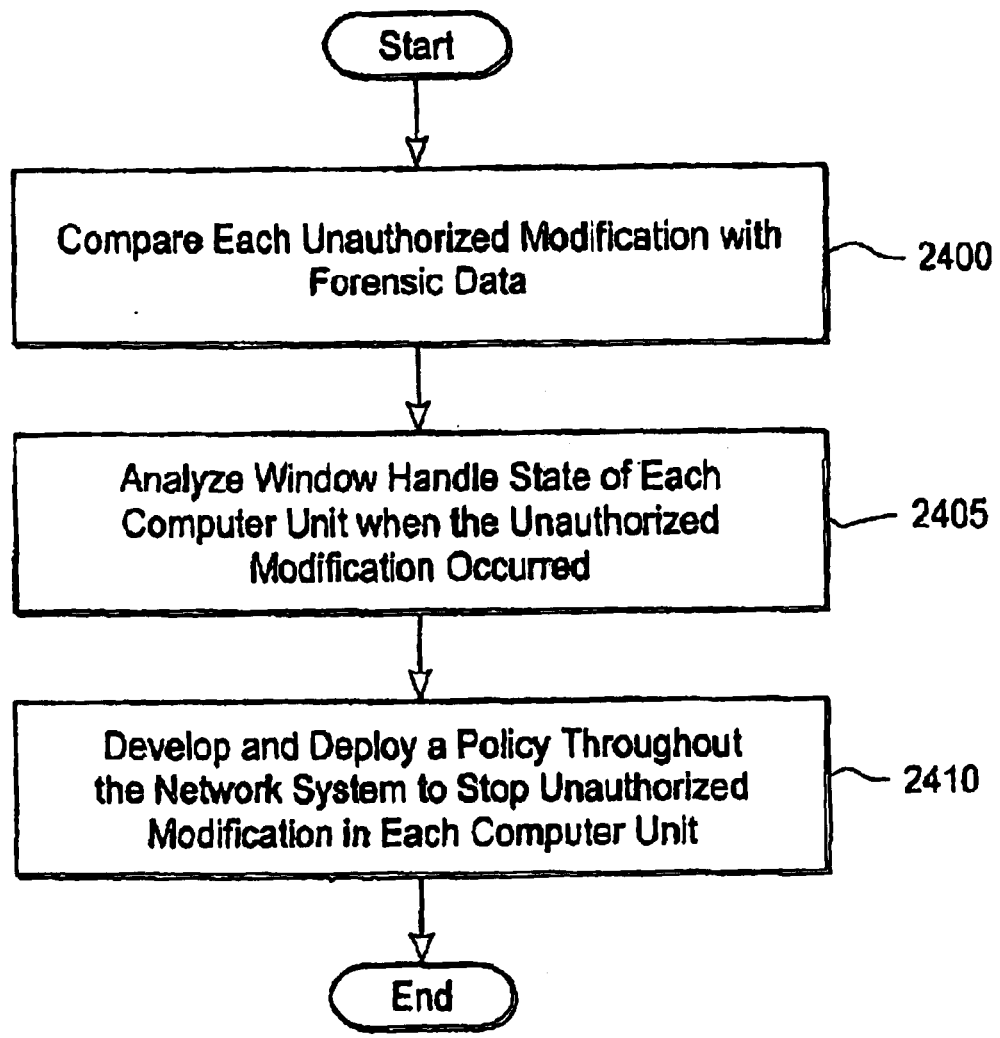
FIG. 24 is a flow diagram illustrating the details of the comparison analysis of the forensic penetration data.

As shown in FIG. 24, the comparison analysis is performed by analyzing each structured signal file which contains forensic penetration data. The file is first analyzed as to the establishing the unauthorized modification and defined within the forensic file. Each unauthorized modification is compared (2400) with forensic data from other computer units 105 with a client application 110, to establish a "horizontal pattern" or consistency in the unauthorized modifications which are occurring across the network system 100. The next analysis (2405) is by determining the "window handle" state of each computer unit 105 when the unauthorized modification occurred. By analyzing (2405) the "window handle state", a "pattern" can be established as to the "user condition" that initiated the unauthorized modification of the computer unit 105.

In performing an automated analysis of the type of modification and the user environment which initiated the modification in a real time environment, the administrator application 115 can then quickly develop a "policy" and deploy (transmit) that policy throughout the network system 100 to automatically stop the unauthorized modification in each computer unit (block 2410).

As shown in FIG. 2, when the client application 110 is installed on a computer unit 105, the client application 110 will initiate a parallel thread (block 201) which will initiate a series of sub-threads, which collect registry information throughout various defined segments of the computer unit 105 registry. The parallel thread 201 is activated during the initial installation or re-initialization if the computer unit 105 is updated with new authorized software.

Each sub-thread activates the independent 32 bit API DLL, which collects registry information within a defined segment. A sub-thread (block 202) initiates the 32 Bit API DLL, which collects all registry data on the HKEY_CLASSES_ROOT registry key. A sub-thread (block 203), initiates the 32 Bit API DLL, which collects all registry data on the HKEY_CURRENT_USER registry key. A sub-thread (block 204) initiates the 32 Bit API DLL, which collects all registry data on the HKEY_LOCAL_MACHNE registry key. A sub-thread (block 205) initiates the 32 Bit API DLL, which collects all registry data on the HKEY_USERS registry key.

All data collected by each 32 Bit API DLL is consolidated by a function (block 206), which stores the data to the local computer unit 105. Once the data has been stored, a function is then initiated (block 207), which transmits all registry configuration data to the administrative unit 108 with the monitor application 115.

Figure 3:
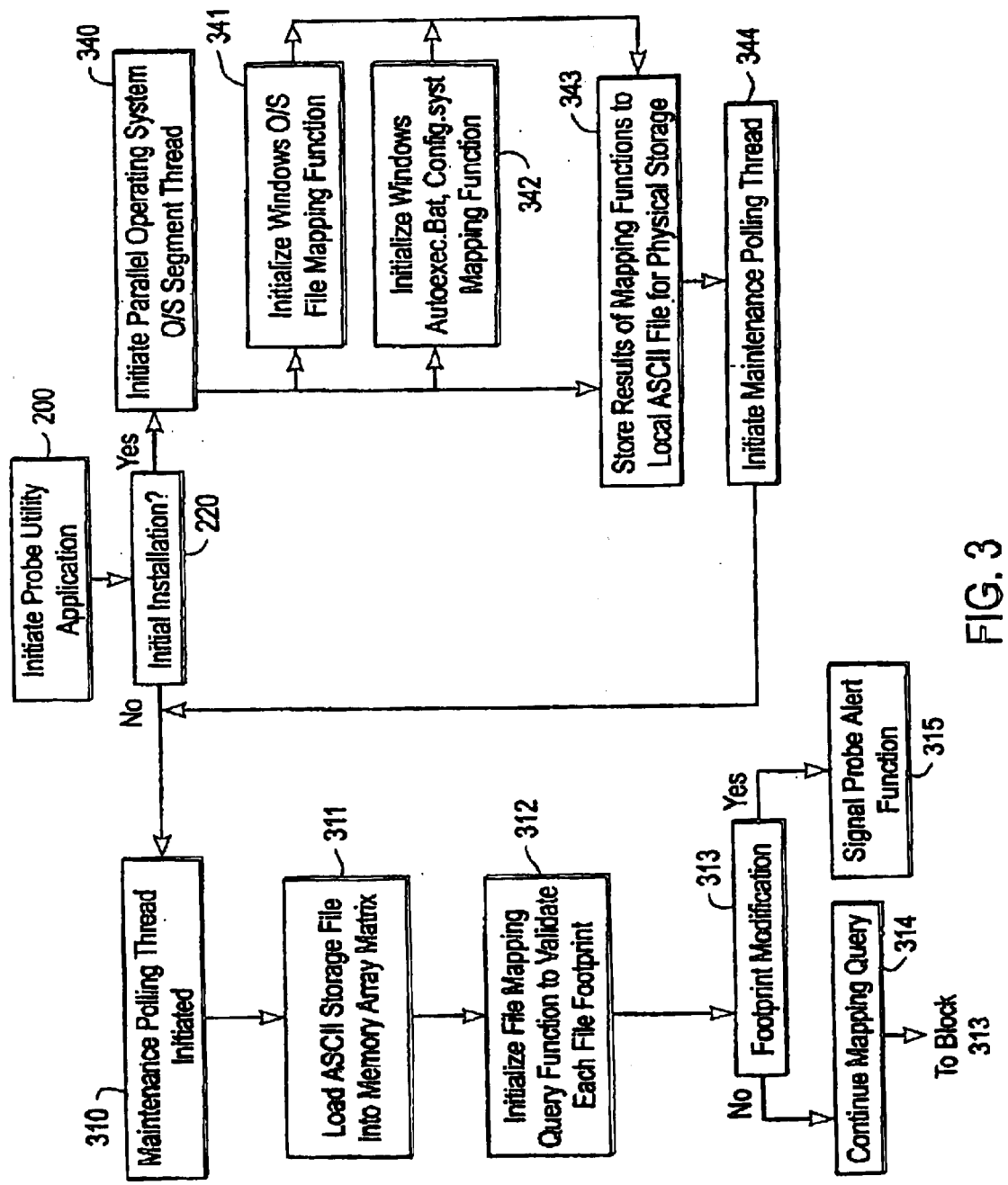
FIG. 3 is a flow diagram of an "electronic mapping" of all critical directories and files relative to the start-up ("boot up") of a computer unit.

Reference is now made to FIG. 3 for purposes of discussing the functional mechanics of the client application 110 in accordance with an embodiment of the present invention. In particular, FIG. 3 is a flow diagram of the "electronic mapping" of all critical directories and files relative to the start-up "boot up" of a computer unit 105.

During the initial installation of a client application 110, an additional parallel threaded function (block 340) is initiated, which retrieves all of the computer unit's internal directory and file information required at the time the operating system initiates during start-up (initial "boot-up").

The computer unit's internal machine hard drive maintains a directory architecture for properly storing, categorizing and separating all directories and files required to initiate the computer unit 105 properly to execute the basic Windows operating system and all those programs which are required at the time of start-up, to initialize third-party applications 130. Once the directory and file information is retrieved by the client application 110, the directory information is stored into memory arrays and is written in a structured ASC file, which is stored within the computer unit 105. The structured ASC file can be electronically retrieved from the computer unit 105, to the monitor station 115 for a detailed analysis by the network administrator.

After the initial recording of the directory and file information, the parallel thread (block 310), which commands these initial functions, initiates a series of sub-functions, which then monitor all directory and file information for real-time changes within the computer unit 105 environment.

Once the main parallel thread which control the directory environment is initiated (block 310), a sub-function is initiated which load all stored directory configuration from data files to memory arrays (block 311). When the memory arrays are loaded, a parallel thread is initiated, which cycles the directory structure of the computer unit 105, analyzing the computer unit 105 for any possible structural changes within the defined directory architecture. If a new directory is detected, the probe function (block 312) will analyze the internal contents of the directory, searching for any possible unauthorized program (block 313). If an unauthorized program is detected, a structure forensic signal file is generated and transmitted back to the computer unit (block 315). If no unauthorized program is detected, the probe will "loop" back to the query function (block 313) and continue to analyze the directory architecture for possible unauthorized programs.

If a program initiates (where the program modifies any of the internal directory or file environment) an internal message is generated from the client application 110 to the computer unit's main screen, alerting the end-user and generating (transmitting) a signal to the monitor station (block 315).

If the modification is an unauthorized change unknown to the user and/or network administration, the computer unit's internal directory and/or file information, which was modified, is then reversed back to its original state.

If an unauthorized program is detected within a directory, the function which analyzes the directory, refers to the stored configuration data, which defines the directory architecture prior to the detection of the unauthorized program. The defined directory structure is then analyzed, to "reverse" or remove the new directory which contains the unauthorized program.

The reversal function is initiated by comparing, the previous architectural "footprint" of the directory to the new (unauthorized) "footprint", and the reverse function is performed, by erasing the new directory with the unauthorized program, or if an unauthorized program is moved into an existing directory, erasing the unauthorized program only.

The characteristics of the change, is then recorded in a structured ASC file and is logged as a penetration pattern. The computer unit 105 then generates (transmits) this penetration pattern file to the monitor station 115 for further comparison analysis by the monitor station 115.

The comparison analysis, which is initiated by the monitor station 115, is a series of parallel threaded functions, which compare all penetration patterns received from all computer units 105 (client applications 110), which transmit information to the monitor station 115.

When the client application 110 is installed on the computer unit 105, a main parallel thread is initialized (block 340), which initiates a series of sub-functions which scan the entire computer unit 105, to record all existing directories (folders) and sub-directories (sub-folders). A sub-function is initiated (block 341), which analyzes the O/S directory structure, "root" and all directories and sub-directories (block 342) which exist on the computer unit 105.

After the completion of this analysis, a function is initiated (block 343), which consolidates and stores the data to the local computer unit 105.

Once all data has been consolidated and stored at the local computer unit 105 and transmitted to the administrative unit 115, a function (block 344), then initiates the main polling thread (block 310) which analyzes the computer unit 105 for any new directory which may contain an unauthorized program.

Figure 4:
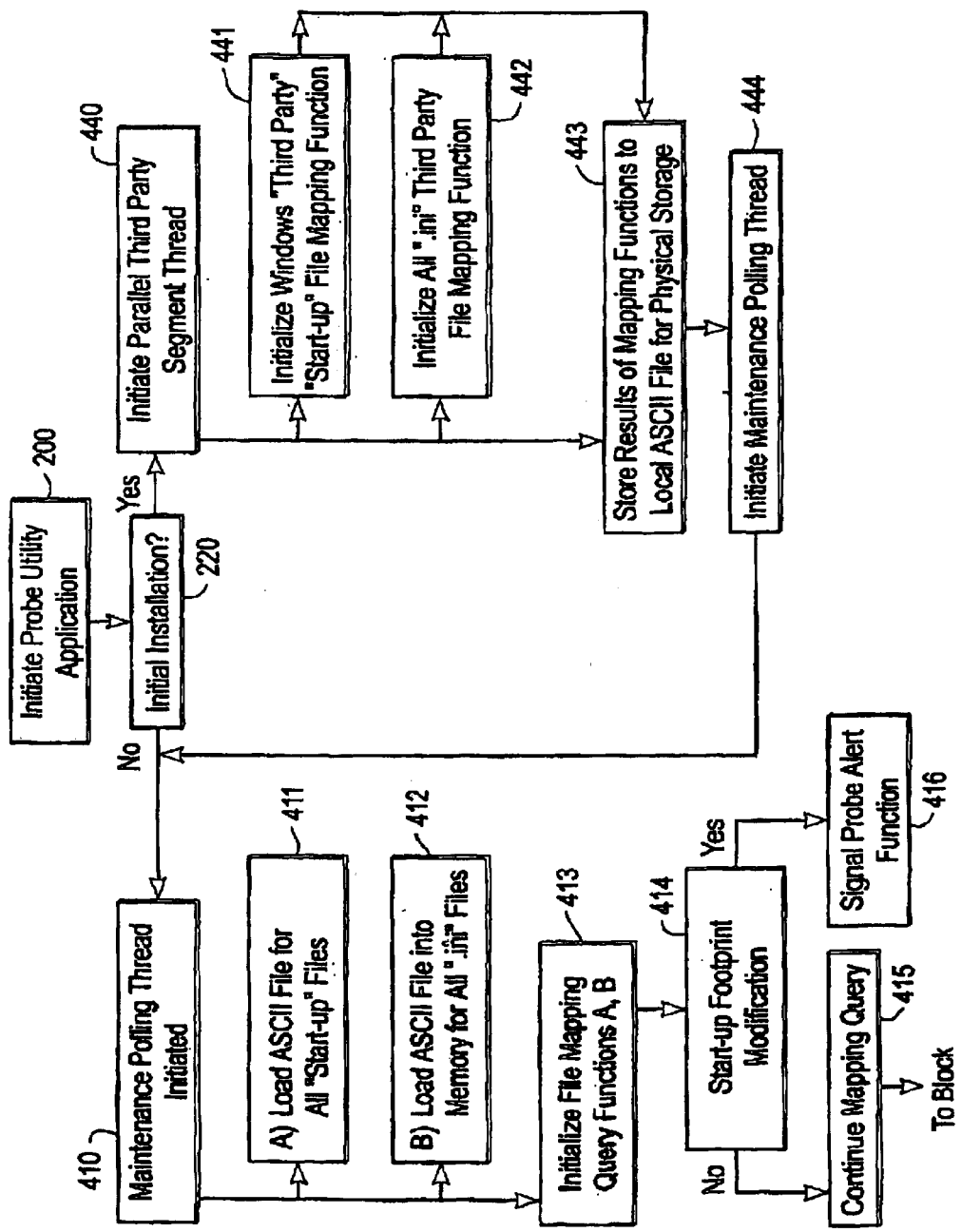
FIG. 4 is a flow diagram of an "electronic mapping" of all critical directories and files relative to the start-up of all third-party applications (programs).

Reference is now made to FIG. 4 for purposes of discussing the functional mechanics of the client application 110 in accordance with an embodiment of the present invention. In particular, FIG. 4 is a flow diagram of an "electronic mapping" of all critical directories and files relative to the start-up of all third-party applications (programs) 130.

During the initial installation of a client application 110, an additional parallel threaded function (block 440) is initiated, which retrieves all of the computer unit's internal directory and file information required at the time the operating system initiates any third-party program which may be installed within the computer unit.

The internal machine hard drive of the computer unit 105 maintains a directory architecture for properly storing, categorizing, and separating all directories and files required to initiate every third-party program and all those additional programs which are required at the time that the third-party application is initialized. The directories may be scanned by use of any known suitable method to look for possible modifications which may include a new unauthorized program installation.

Once the third-party directory and file information is retrieved by the client application 110, the directory information is stored into memory arrays and is written in a structured ASC file, which is stored within the computer unit 105. The structured ASC file can be electronically retrieved from the computer unit 105, to the monitor station 115 for a detailed analysis by the network administrator.

After the initial recording of the directory and file information, the parallel thread (block 410) initiates a series of sub-functions (block 413), which then monitor all directory and file information for real-time changes to any third-party application start-up within the computer unit environment.

If a program initiates and modifies any of the internal directory or file environment, an internal message is generated from the client application 110 to the computer unit 105 main screen, alerting the end-user and generating (transmitting) a signal to the monitor station 115.

If the modification is an unauthorized change that is unknown to the user and/or network administration, the internal directory and/or file information, which was modified, is then reversed back to its original state.

The characteristics of the change are then recorded in a structured ASC file and are logged as a penetration pattern. The computer unit 105 then generates (transmits) this penetration pattern file to the monitor station 115 for further comparison analysis by the monitor station 115.

The comparison analysis initiated by the monitor station 115 is a series of parallel threaded functions, which compare all penetration patterns received from all computer units 105 (client applications 110), which transmit information to the monitor station 115. This comparison analysis was previously described above.

When the parallel thread (block 410) is initialized, the function in block 411 is initiated, and this function loads all third party "start up" information into memory arrays. Once the function (in block 411) has completed its operations, an additional function (block 412) is initiated, which loads the critical "file signature" of all third party ".ini" (initialization) files into memory arrays.

After all information is loaded into memory, the parallel thread which initiated the above functions, initializes (413) a polling function (block 414), which constantly cycles, comparing all third party "start up" information and ".ini" file information, to the previously recorded information which is stored into memory arrays.

If an unauthorized modification is detected, the function (in block 414) generates a structured signal file and transmits the structured signal file to the administrative application 115. If no unauthorized modification is detected, the function continues to loop (block 415) back to its poling function which was initiated in block 414.

A series of additional parallel threads are initiated to collect and manage all operating system (O/S) messages, which are generated between the O/S and all third-party applications. These threads initiate a series MFC functions and/or independent 32 Bit API DLLs designed and developed by the inventor. These MFC functions and 32 Bit API DLLs, initiate a series of operating system (O/S) "hooks" and MFC inter-links, which monitor and collect real-time data from memory buffers regarding mouse movement, application to O/S messages, device access, keyboard access, communications port access, Internet web browser access, application focus, electronic mail management, disk file movement, active window handle task listing, disk drive (media) management, task bar management, and program manager management.

When the client application 110 is installed on the computer unit 105, a parallel thread is initiated (block 440), which initializes a function (block 441), which scans the computer unit 105 for all "third party" "start up" files which may reside within the computer unit.

When the function (block 441) has been completed, an additional function is initialized (block 442), which scans the computer for all ".ini" (initialization) files and records the "critical file signature" of each file within the computer unit 105.

Upon completion of the function (block 442), a function (block 443) consolidates the information and stores all data is physical files within the computer unit 105. At the completion of the function in block 443, an additional function (block 444) is initiated and starts the maintenance poling thread as described in block 410.

Figure 5:
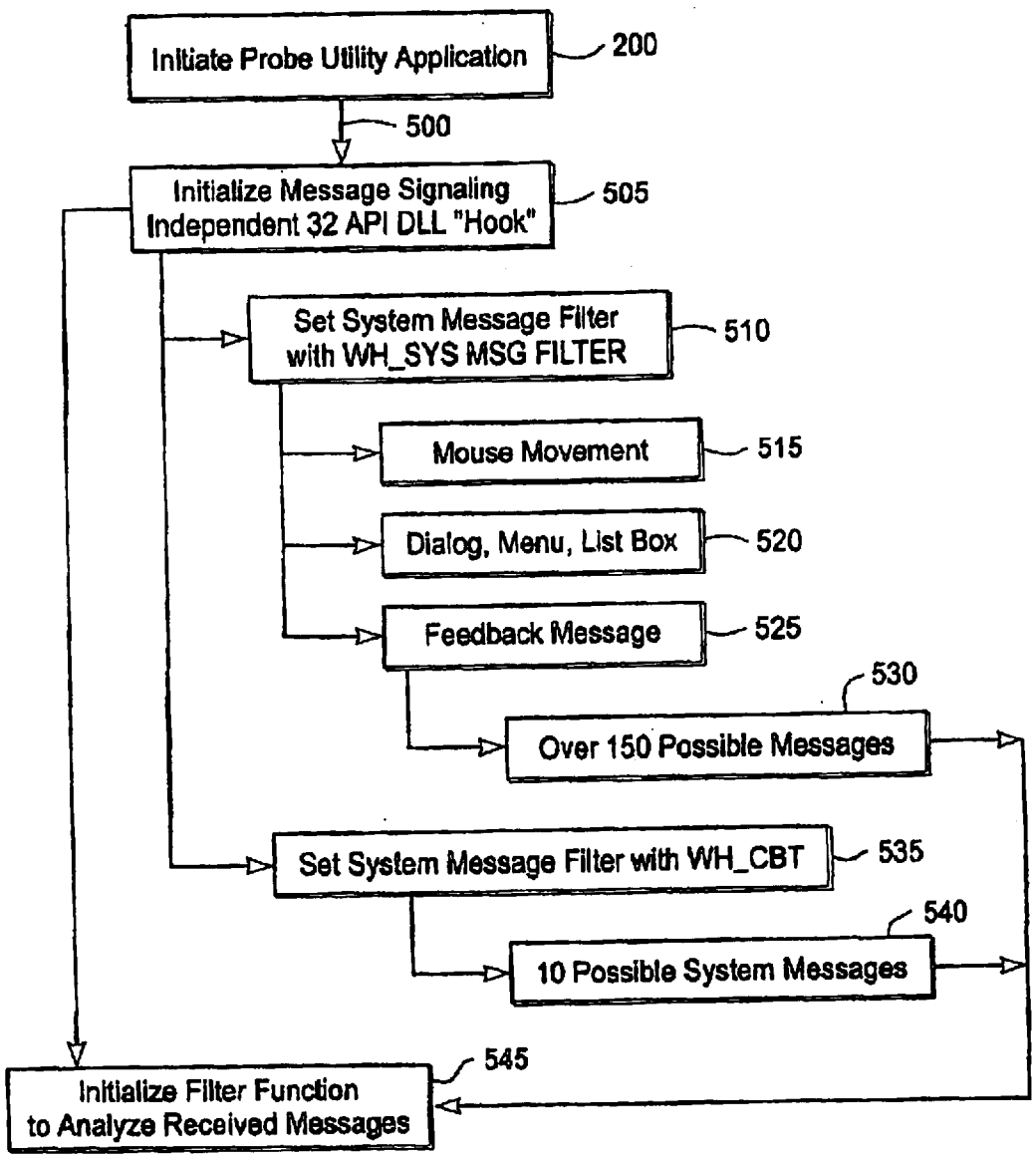
FIG. 5 is a flow diagram of a method of intercepting all messages that are generated between the operating system and third-party applications.

Reference is now made to FIG. 5 for purposes of discussing additional functional mechanics of the client application 110 in accordance with an embodiment of the present invention. In particular, FIG. 5 is a flow diagram of a method of intercepting all messages that are generated between the operating system 129 and third-party applications 130.

A series of MFC functions and 32 Bit API DLLs designed and developed by the inventor, initiate (block 505) a series of operating system (O/S) "hooks" and MFC interlinks, which monitor and collect real-time data from memory buffers regarding mouse movement and application to O/S messages. The hooks are part of the "open architecture" development of Microsoft Windows. FIG. 5 illustrates a "hook" sequence into the actual Microsoft O/S kernel, where at least some of the following may be extracted: all Window object identifications (Ids), window object type, mouse movements, mouse instructions and integer relays which process between the O/S kernel and all application activity.

A parallel thread is initiated (500), which activates the independent 32 bit API DLL (505), designed and developed by the inventor, which establishes a "hook" into the actual O/S kernel. The "hook" establishes an interlink with the WH_SYSMSG ID (block 510), which monitors the kernel interrupt for mouse movement and mouse activity (block 515), Dialog, Menu, List Box activity, which defines the Window object ID and the Window object type (block 520) and receives an O/S message as to the mechanical operation which is being performed by the kernel (block 525).

Based on the information received under to WH_SYSMSG ID, the "hook" can translate its ID (block 535) to the WH_CBT ID, to collect more information about O/S kernel mechanics which are being initiated in a real time environment.

The information received from the kernel system "hook" is compared with other information, which intercepts the "high level" O/S information, such as analysis of the active Window handle listing, the active Window focus handle, along with memory arrays which currently store the status of all Registry, O/S and third party "start up" information, which formulates a "picture" which is interpreted by the client application 110 as to the actual "real time" machine and user condition (or event) which is being initiated on the computer unit (block 545).

The 32 bit API DLL, designed and developed by the inventor, relays all signal messages intercepted by Window object access, and type of window object (520), menu or dialog box object ID, mouse movement and position. Based on the signal (integer) received from the API, the MFC parallel thread managing the central processing unit (CPU) can determine the course of action initiated by the user. This information (525) is then processed (545) in a real time environment, to determine the "intent" of the user and whether the user action in authorized on unauthorized.

Figure 6:
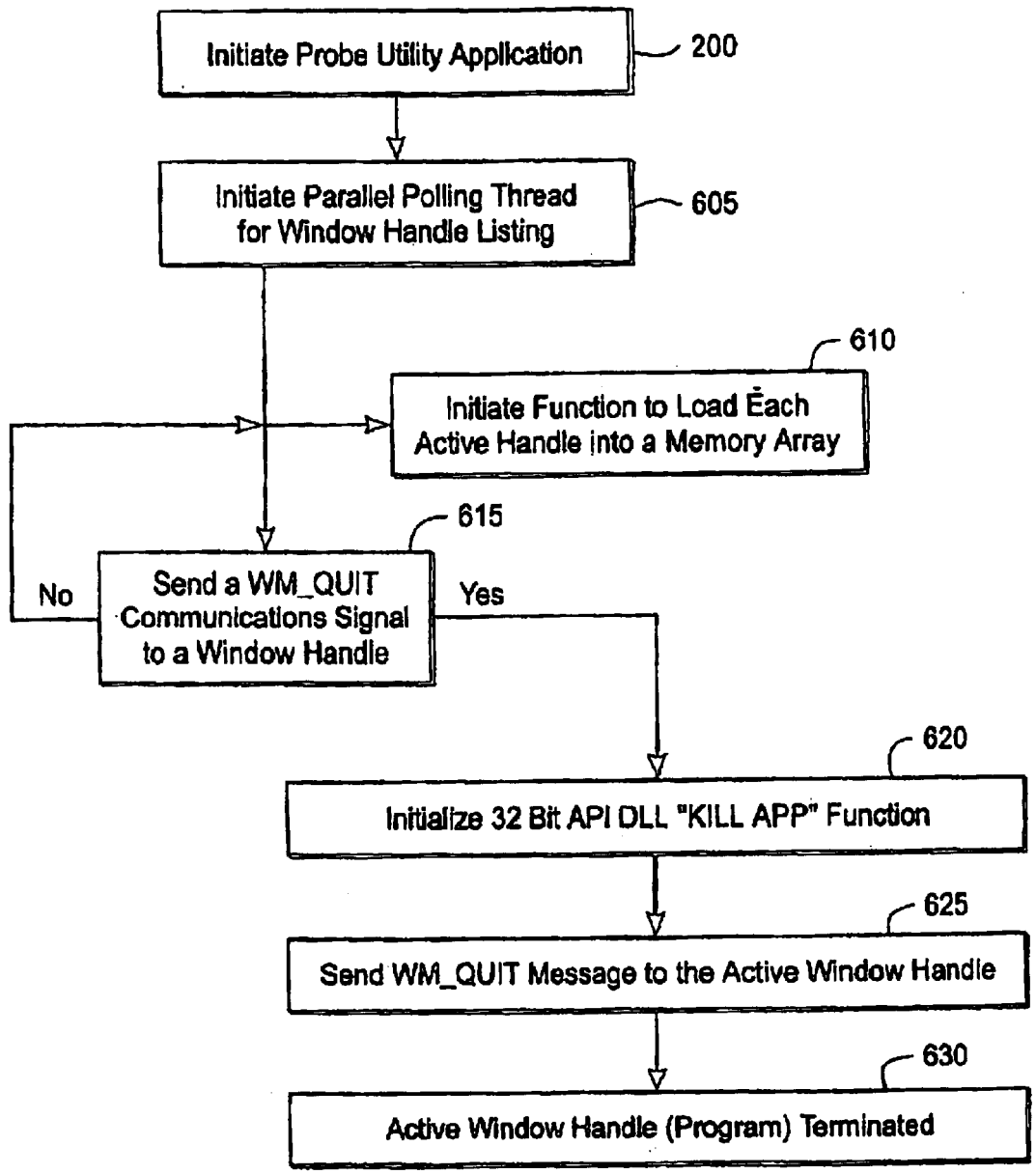
FIG. 6 is a flow diagram of a method of sending an inter-process communications message to any identifiable windows handle, which resides within that active task manager listing.

Reference is now made to FIG. 6 for purposes of discussing additional functional mechanics of the client application 110 in accordance with an embodiment of the present invention. In particular, FIG. 6 is a flow diagram of a method of sending an inter-process communications message to any identifiable windows handle, which resides within that active task manager listing.

The independent 32 Bit API DLL, designed and developed by the inventor, receives real time status information from the existing MFC parallel threads, which determine if the users action or internal program activity is valid or invalid. The validity is determined by comparing the actual activity to all of the parallel threads (FIGS. 1 through 5), which are monitoring the registry, O/S, third party integrity and operating system kernel messages of the computer unit 105.

If the user or program activity is determined to be invalid, the parallel thread initiates the independent 32 Bit API designed and developed by the inventor, which terminates the program activity which is currently in main focus by the user or unmanned computer.

A parallel thread is initiated (block 605), which cycles the active window handle task listing for all identifiable handles active within the computer unit 105. This parallel thread constantly cycles, monitoring the Window I/O (block 610) and monitoring the actual window handle which is in FOCUS by the user of the computer unit.

Based on the information which is processed as described in FIGS. 1 thru 5, if an unauthorized event is being initiated within the computer unit 105, the parallel thread (block 610) will send an automated inter process communications (IPC) signal message WM_QUIT (block 615) to the independent 32 bit API DLL, designed and developed by the inventor (block 620), which will accept the IPC and transmit the WM_QUIT message (block 625) to the active window handle which is current in FOCUS by the user.

The API will then check the status of the IPC, to determine the success of the message IPC Sent, then pass all information back to the main parallel thread, which will determine if additional action (block 630) will be necessary to stop the unauthorized event taking place within the computer unit 105.

Figure 7:
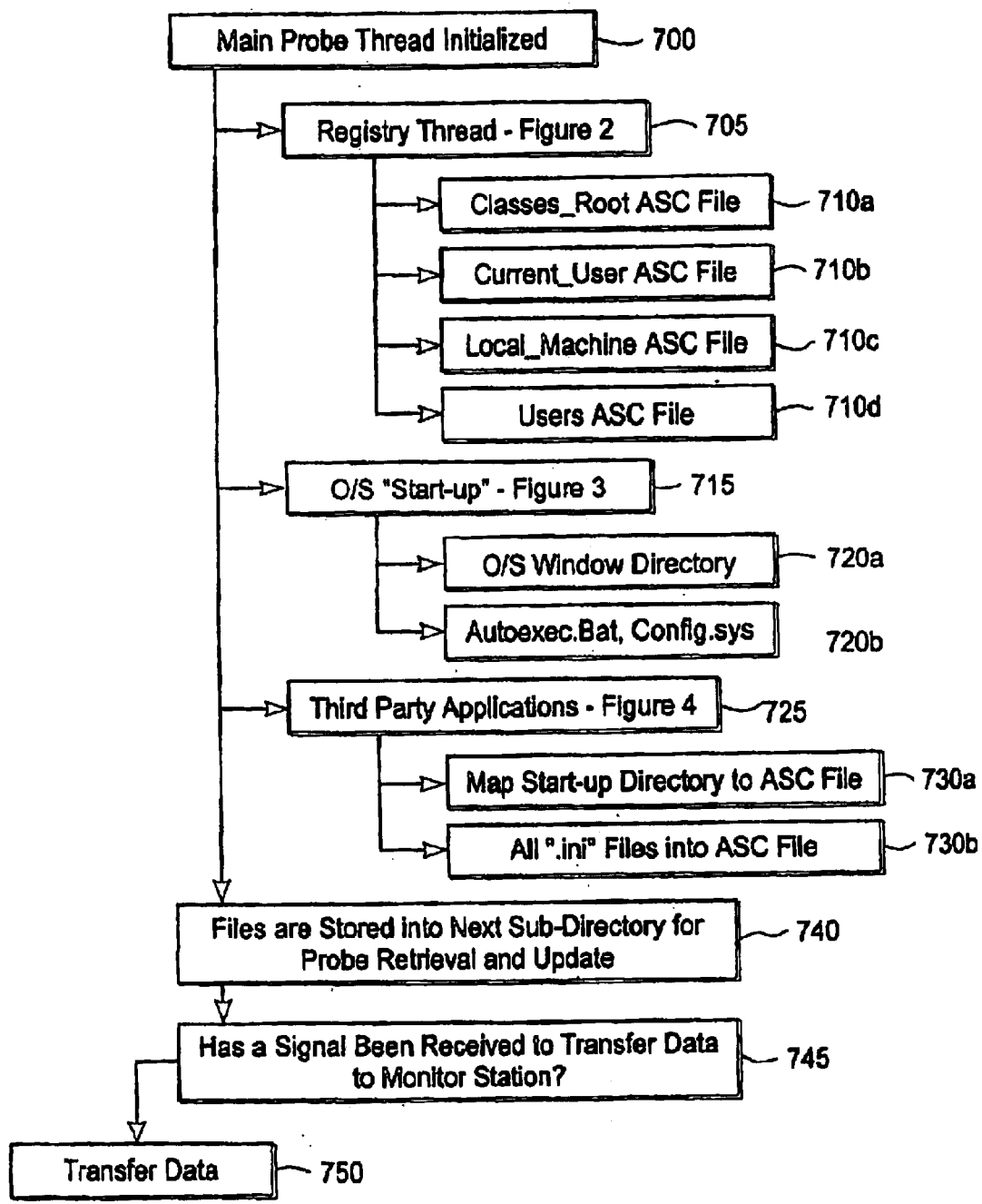
FIG. 7 is a flow diagram of a process of collecting all computer unit (machine environment) information, within the internal computer unit, and organizing this information is such a way as to automatically transmit this data to a monitor station.

Reference is now made to FIG. 7 for purposes of discussing the functional mechanics of the client application in accordance with an embodiment of the present invention. FIG. 7 is a flow diagram of a process of collecting all computer unit (machine environment) information, within the internal computer unit 105, and organizing this information is such a way as to automatically transmit this data to a monitor station 115.

The process for automatically collecting computer unit (machine environment) data on the internal computer 105 and organizing the information for automatic or "request on demand" transmission to a monitor station 115, is managed by a parallel thread (block 700) which receives a structure file signal from the monitor station 115, as described above.

If a signal has been received from the monitor station 115, the parallel thread initiates an MFC sub-function, which transmits (block 750) all configuration data to the monitor station 115.

The function in block 705 and the data indicated in blocks 710a through 710d were similarly described above with regard to FIG. 2. The function in block 715 and the data indicated in blocks 720a through 720b were similarly described above with regard to FIG. 3. The function in block 725 and the data indicated in blocks 730a through 730b were similarly described above with regard to FIG. 4.

The collected computer unit (machine environment) data are stored locally for probe retrieval and update (block 740). If a structure file signal is received from the monitor station 115 (block 745), as described above, then the collected machine environment data is transferred to the monitor station 115.

Figure 8:
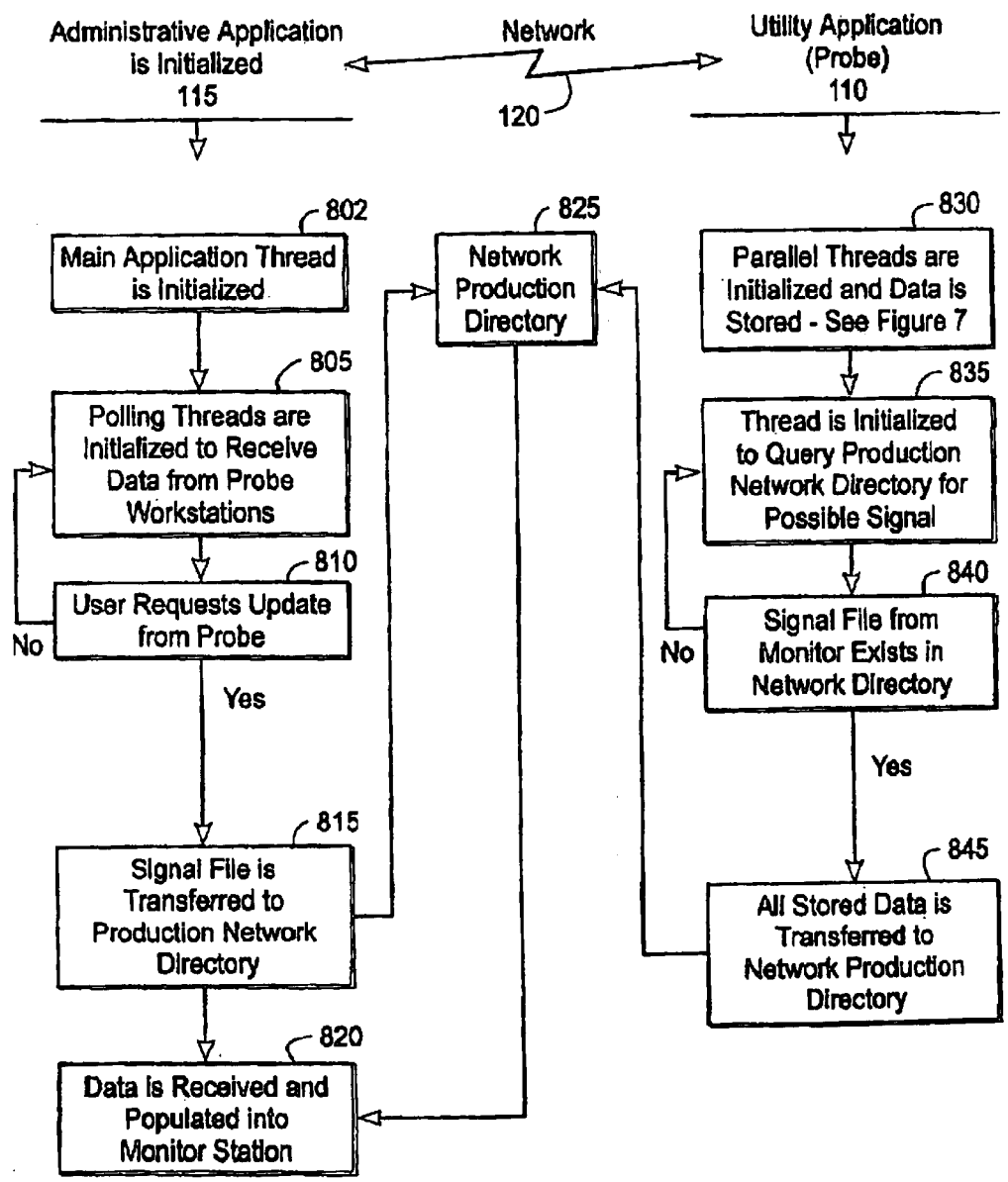
FIG. 8 is a flow diagram of a process of automatically collecting all computer unit (machine environment) data from all computer units on a local area network (LAN) or wide area network (WAN).

Reference is now made to FIG. 8 for purposes of discussing additional functional mechanics of the client application 110 in accordance with an embodiment of the present invention. In particular, FIG. 8 is a flow diagram of a process of automatically collecting all computer unit (machine environment) data from all computer units 105 on a local area network (LAN) or wide area network (WAN) (e.g., network system 100).

The monitor station 115 has the capability to automatically receive all configuration data from a computer unit 105 or transmit a structure signal file (initiated by the administrator), to request all configuration data to be transmitted to the monitor station 115.

FIG. 8 is a flow diagram of an operation after the administrative application 115 is installed on the network system 100 and a client application 110 is installed on the network system 100, and if the network path has been set up correctly, where the client application 110 can effectively communicate with the administrative application 115. Essentially, after the client application 110 performs its analysis of the computer unit 105, stores all information to its data files, and converts all data into memory arrays (block 830), a parallel thread (block 835) is initiated to poll the status of the network connection and to ensure all proper pathways are established for the client application 110 to communicate with administrative application 115.

If the parallel thread (block 840) detects the presence of the network and all defined pathways are established correctly, the client application 110 will transmit all data to the administrative application 115 (block 845).

The administrative application 115 will also start a parallel thread (block 802), which will poll (block 805) to check the status of the network and whether the defined network pathways are established. If the overall network status is correct, the administrative application 115 will automatically receive structure file signal information from the client application 110.

In the event certain command and control instructions are initiated from the administrative application 115 via the user, such as an update request, an internal function (block 810) will initiate the structured signal file, which in turn will be transmitted to the client application 110 (block 815). In one embodiment, the structured signal file is transferred by use of a network production directory (block 825) which may, for example, be located locally in the computer unit 105. The function passes the information back to the main parallel thread which will, in turn, receive and process the information received from the client application (block 820).

Figure 9:
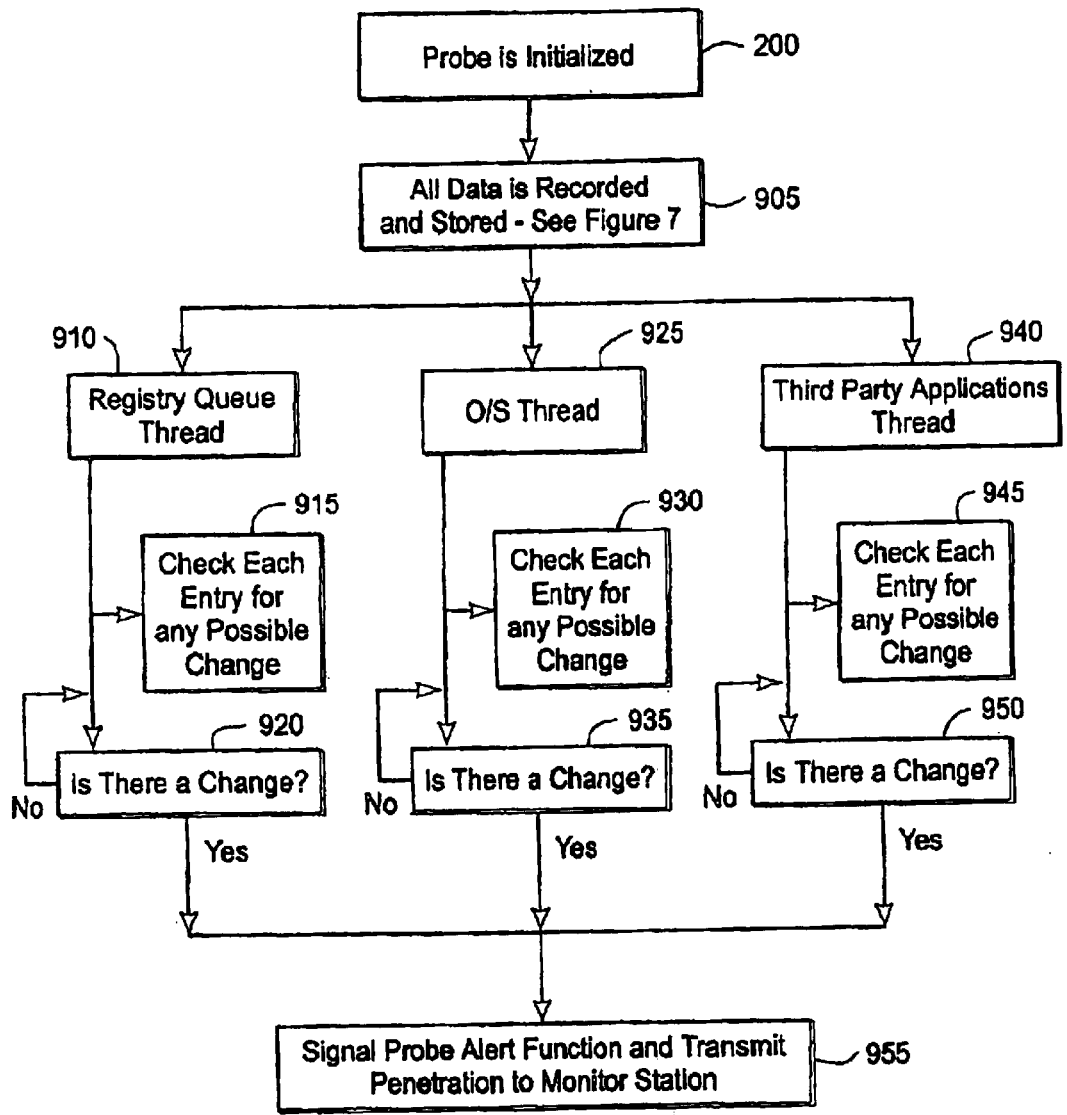
FIG. 9 is a flow diagram of a process of automatically analyzing the "penetration patterns" of foreign entity programs which penetrate a computer unit to collect, report, initiate a task or destroy information on a computer unit.

Reference is now made to FIG. 9 for purposes of discussing additional functional mechanics of the client application 110 in accordance with an embodiment of the present invention. In particular, FIG. 9 is a flow diagram of a process of automatically analyzing the "penetration patterns" of foreign entity programs which penetrate a computer unit to collect, report, initiate a task or destroy information on a computer unit. The utility application 110 is initialized, thus causing the above-mentioned probing function to initialize (Block 200). The function of block 905 represents the data collection functions performed by blocks 201–206 (FIG. 2), blocks 340–343 (FIG. 3), and blocks 440–443 (FIG. 4).

The function of block 910 represents the functions performed by blocks 210–215 (FIG. 2). The checking functions of blocks 915–920 are represented by the functions of blocks 216–217. The function of block 925 represents the functions performed by blocks 310–312 (FIG. 3). The checking functions of block 930–935 are represented by the functions of blocks 313–314. The function of block 940 represents the functions performed by blocks 410–413 (FIG. 4). The checking functions of block 945–950 are represented by the functions of blocks 414–415. The functions of block 955 are represented by the functions of blocks 218, 315, and 416, as previously described above. Thus, FIG. 9 shows an overview of an overview of an analysis of penetration patterns which are received from each computer unit 110 transmitting data to the monitor station 115.

Figure 10:
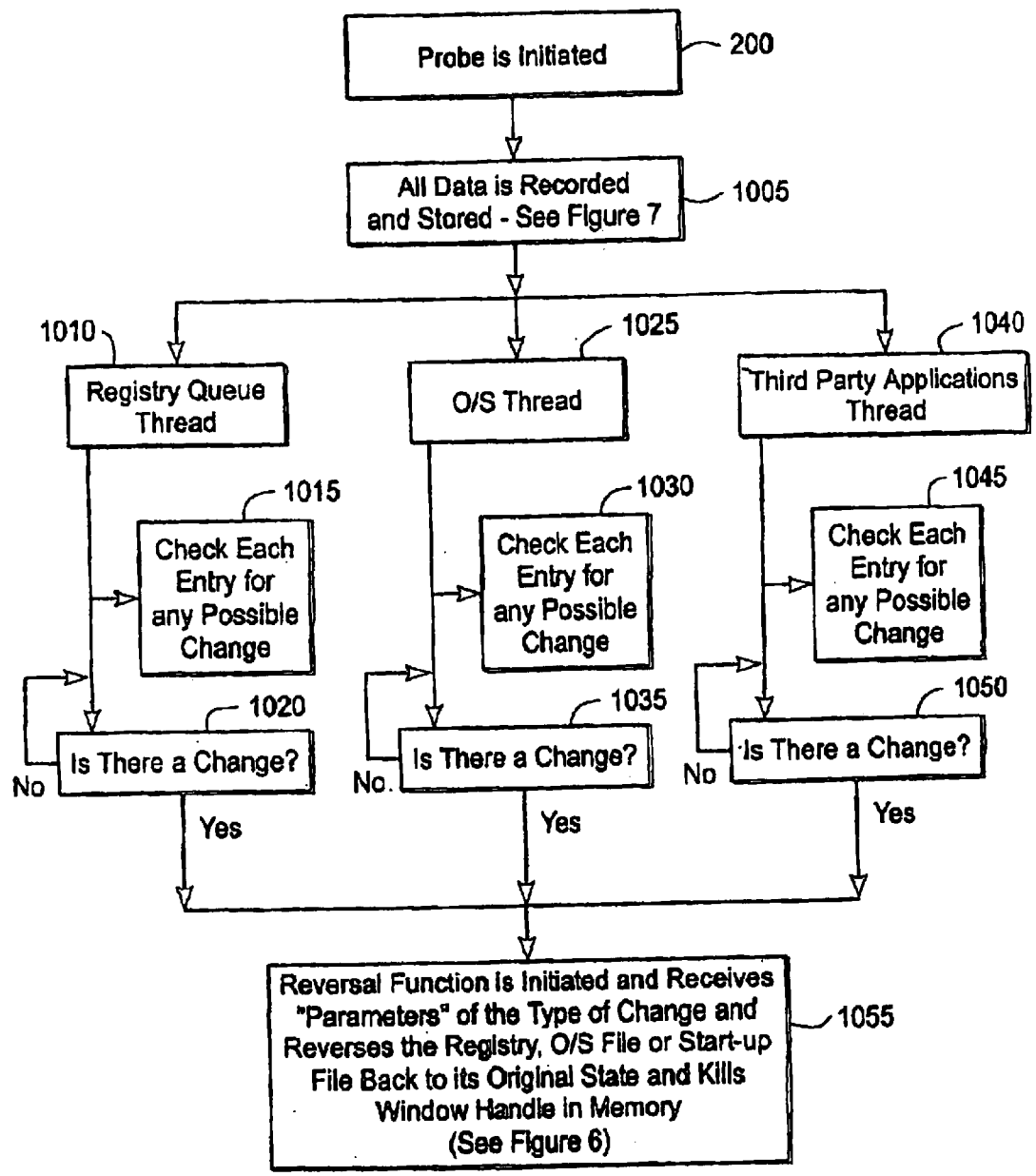
FIG. 10 is a flow diagram of a process of automatically reversing any computer unit (machine environment) changes that a foreign entity program may initiate within the actual computer unit.

Reference is now made to FIG. 10 for purposes of discussing the functional mechanics of the client application in accordance with an embodiment of the present invention. In particular, FIG. 10 is a flow diagram of a process of automatically reversing any computer unit (machine environment) changes that a foreign entity program may initiate within the actual computer unit 110. The functions in blocks 1005 through 1050 were previously described in and are identical to blocks 905–950 in FIG. 9. In block 1055, the client application 110 looks at the data dictionary that is local to the client computer 105, and if there is an unauthorized modification in the architecture by a foreign entity program that is initiated in the computer unit 105, then the client application 110 will reverse the architecture back to the defined architecture prior to the unauthorized modification.

Figure 11:
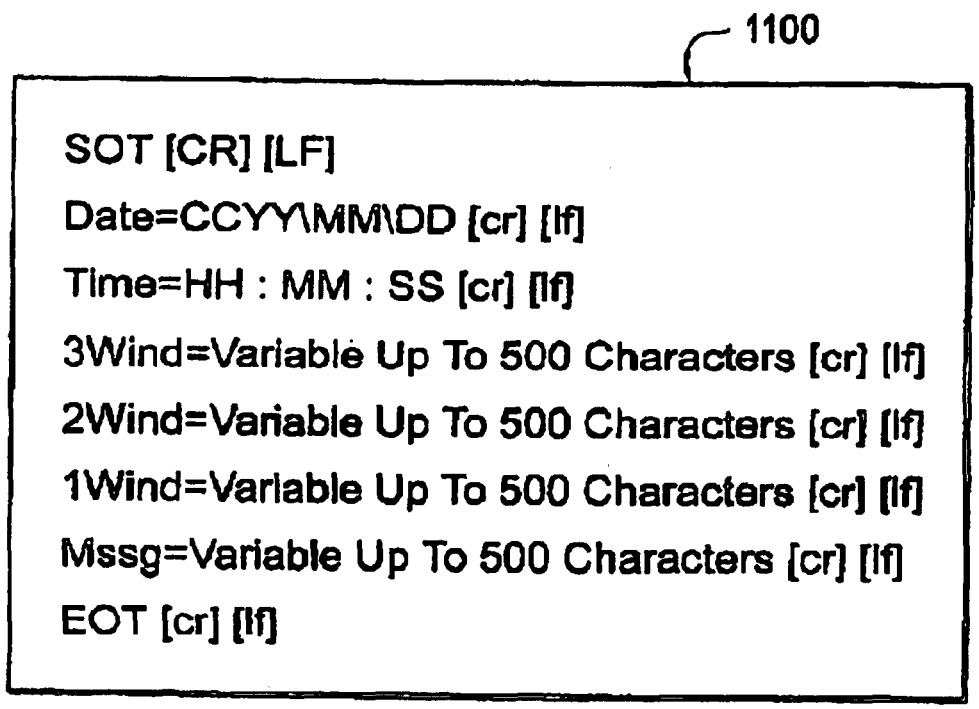
FIG. 11 is a block diagram of a structured signal file which captures all forensic data relative to the "penetration pattern", which is transmitted and stored at the monitor station.

Reference is now made to FIG. 11 for purposes of discussing the functional mechanics of the client application in accordance with an embodiment of the present invention. In particular, FIG. 11 is a block diagram of a structured signal file which captures all forensic data relative to the "penetration pattern", which is transmitted and stored at the monitor station 115.

The structured file 1100 is created and transmits all "penetration pattern" (forensic) data from the client application 110 to the monitor station 115. As shown in FIG. 11, the following are shown in the data structure 1100 that permits a computer forensic design that functions in a real time environment.

SOT[cr] [lf]
Date=CCYY\MM\DD[cr] [lf]
Time=HH:MM:SS[cr] [lf]
3Wind=Variable Up To 500 Characters[cr] [lf]
2Wind=Variable Up To 500 Characters[cr] [lf]
1Wind=Variable Up To 500 Characters[cr] [lf]
Mssg—Variable Up To 500 Characters[cr] [lf]
EOT[cr] [lf]
The above parameters are defined as follows:
SOT—Start Of Transmission;
[cr]—Carriage Return ASCII Control Character;
[lif]—Line Feed ASCII Control Character;
EOT—End Of Transmission;

3Wind—Previous Window Handle In Focus Before 2Wind;
2Wind—Previous Window Handle In Focus Before 1Wind;
1Wind—Window Handle In Focus At The Time Of Unauthorized Activity; and
Mssg—Definition Of Unauthorized Activity.

Figure 12:
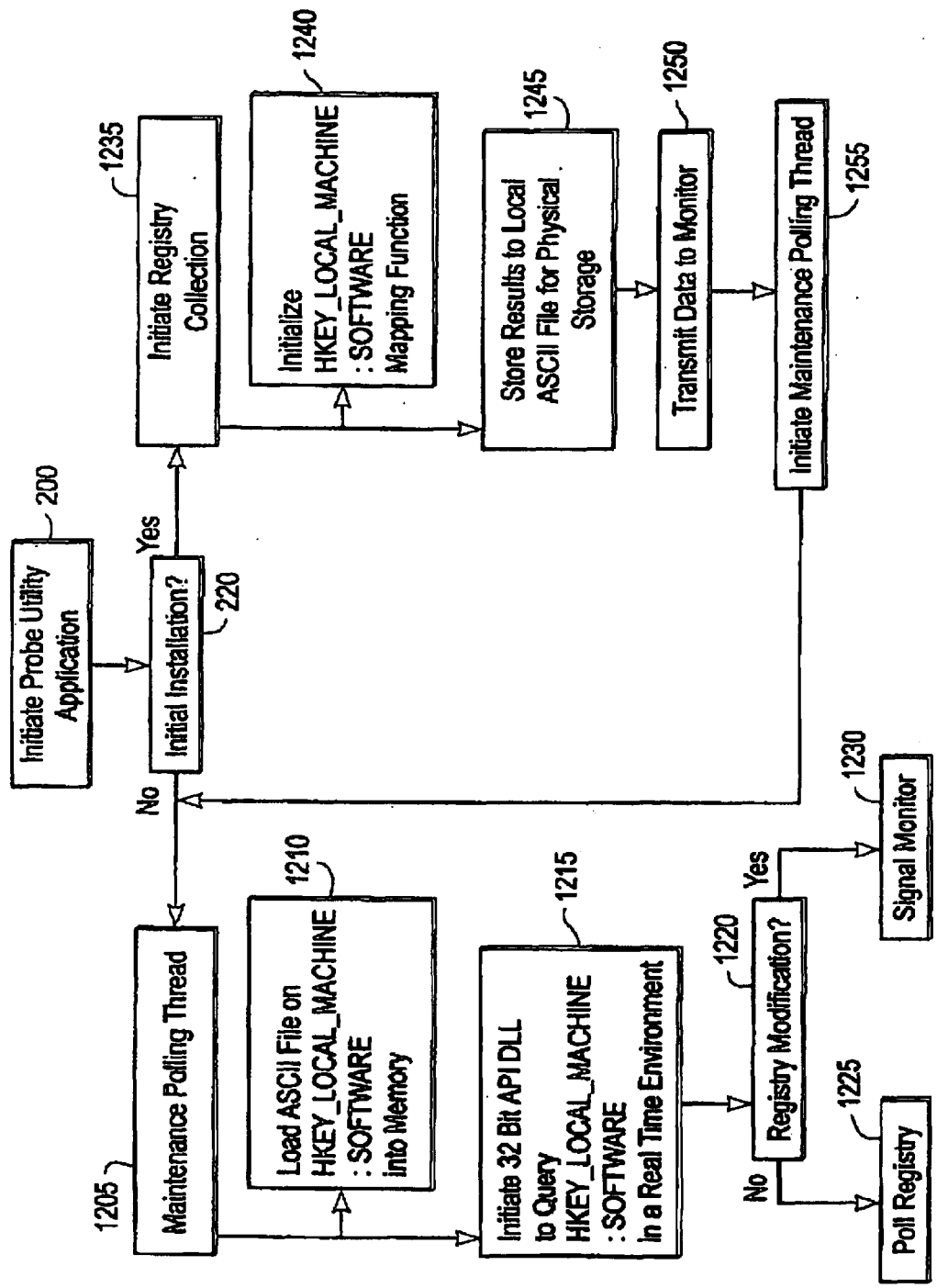
FIG. 12 is a flow diagram of a process for automatically detecting any unauthorized modification of the HKEY_LOCAL_MACHINE:Software registry segment in a real time environment.

Reference is now made to FIG. 12 for purposes of discussing the functional mechanics of the client application in accordance with an embodiment of the present invention. In particular, FIG. 12 is a flow diagram of a process for automatically detecting any unauthorized modification of the HKEY_LOCAL_MACHINE:Software registry segment in a real time environment. The flow diagram illustrate a process of automatically analyzing the "penetration patterns" of foreign entity programs which may penetrate a computer unit 105 to collect, report, initiate a task or destroy information on a computer unit 105. Analysis of penetration patterns which are received from each computer unit 105 are transmitted as data to the monitor station 115.

After the collection of all internal registry data of a client computer 105 is transmitted to the monitor station 115, a PC probe (of the client application 110) initiates an additional parallel threaded function (block 1205) designed and developed by the inventor, and the additional parallel threaded function initiates an additional independent 21 API DLL designed and developed by the inventor, which performs an analysis on the HKEY_LOCAL_MACHINE:Software (hereafter known as the DEFINED SEGMENT), which is a segment of the internal registry. One example of the above PC probe is of the type from Granite Technologies, Inc., a Tennessee Corporation. The analysis includes a method opening the physical registry key and opening and querying the DEFINED SEGMENT for any possible unauthorized changes within this particular area of the registry.

The internal registry is a database used by the Windows operating system (e.g., Windows 95 and NT) to store configuration information. The registry typically includes the following major sections:

(1) HKEY_Classes_Root—file associations and Object Linking and Embedding (OLE) information;
(2) HKEY_Current_User—all preferences set for current user;
(3) HKEY_User—all the current user information for each user of the system;
(4) HKEY_Local_Machine—settings for hardware, operating system, and installed applications;
(5) HKEY_Current_Configuration—settings for the display and printers;
(6) HKEY_Dyn_Data—performance data.

Most Windows applications write data to the registry, at least during installation. The registry can be edited directly by using the Registry Editor (regEdit.exe) provided with the operating system. Thus, the Windows registry stores system configuration details so that Windows looks and behaves in a desired manner. The registry stores user profile information such as wallpaper, color schemes, and desktop arrangements in a file called "user.dat" and stores hardware-specific details and software-specific details, such as device management and file extension associations, in a file called "system.dat". In many ways, the Registry replaces functions of win.ini and system.ini from earlier versions of Windows, though these files persist because so many Windows applications refer to them.

The registry is opened by initiating the 32 Bit API function call defined within the Microsoft API development environment.

At the time the registry is opened, the DEFINED SEGMENT is passed as a parameter to successfully open the particular segment of the registry. This parameter is included within the 32 API function (from the Microsoft API development environment), which is initiated to open a registry segment.

The method includes establishing a "base count" of all authorized entries within this particular segment of the registry. The "base count" is the total amount of entries which are recorded within the defined segment of the registry. After the "base count" is established, a numeric integer of the "base count" is stored in memory (e.g. RAM). The MFC parallel thread (block 1215) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1240) initiates the 32 Bit API DLL, which collects all registry data on the HKEY_LOCAL_MACHINE:SOFTWARE registry segment. The other functions in FIG. 12 perform as similarly described in the previous drawings for corresponding similar functions.

The algorithm method designed by the inventor queries the DEFINED SEGMENT of the registry in such a way, where virtually no resource utilization is registered within the CPU. This is possible, because within the defined segment of the registry, entries are listed in no particular order and are random in nature.

While, the actual O/S has to query the each registry segment within the entirety of the registry to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the DEFINED SEGMENT of the registry. If the maximum count equation, does not equal the pre-calculated results, the defined registry segment has been violated by a manual edit from the user or by modification from an unauthorized program.

As an example, HKEY_LOCAL_MACHINE:Software may contain 50 entries which record various applications which are installed within the computer. The 32 Bit API DLL which monitors and controls this environment, will poll this segment, to detect an unauthorized registry entry or deletion within every five to eight seconds. If the registry segment is modified, the unauthorized modification is detected and reported to the main parallel thread which initiated the 32 Bit API DLL.

The pre-calculated results guarantees 100% accurate results from the query (where the query is from the registry segment itself via the 32 API function call from the Microsoft 32 Bit API developers environment), because the algorithm is designed to query the defined segment, for example, every about five to eight seconds. The speed of the query makes it impossible for a user to delete and add a new entry to the defined segment, without being intercepted by the algorithm.

The speed and accuracy at about five to eight seconds is sufficient, because any unauthorized program or user which attempts to delete and then add a record to a registry segment, forces the registry segment into an "update cycle", whereby it performs its internal "house keeping". The "house keeping" requires around about 4 to 6 seconds to mechanically perform its internal operations. Furthermore, unauthorized programs perform a calculation to add entries to a defined area of the registry, which makes the algorithm designed by the inventor 100% accurate against unauthorized program activity.

Finally, the registry protection, along with the remaining functions which protect the O/S and third party start up environment, provide a multi-layer defense posture protecting the computer unit 105 from all points of an unauthorized modification to the computer unit.

The above-mentioned parallel threads can perform the polling functions without causing a spike or damage to the resources utilized by the CPU clock. This advantageous result is accomplished by designing the cycling of the parallel threads in their execution state with an automated sleep state and based on how critical the particular thread, so that the system operation does not slow down.

Figure 13:
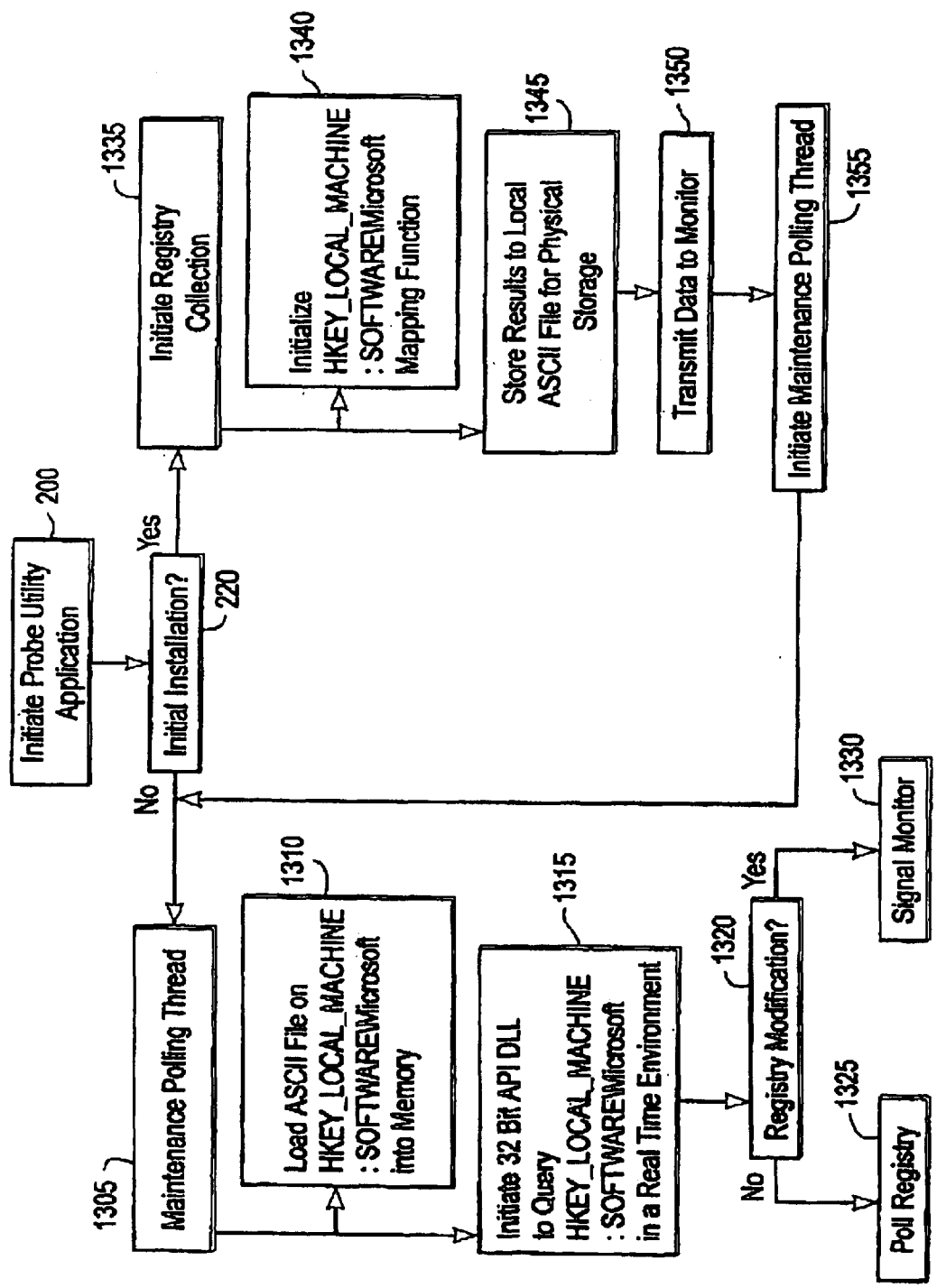
FIG. 13 is a flow diagram of a process for automatically detecting any unauthorized modification of the HKEY_LOCAL_MACHINE:Software\Microsoft registry segment in a real time environment.

Reference is now made to FIG. 13 for purposes of discussing additional functional mechanics of the client application 110 in accordance with an embodiment of the present invention. In particular, FIG. 13 is a flow diagram of a process for automatically detecting any unauthorized modification of the HKEY_LOCAL_MACHINE: Software\Microsoft registry segment in a real time environment.

After the collection of all internal registry data is transmitted to the monitor station 115, the PC Probe in the client application 110 initiates an additional parallel threaded function designed and developed by the inventor, which initiates an additional independent 21 API DLL designed and developed by the inventor, which performs an analysis on the HKEY_LOCAL_MACHINE:Software/Microsoft segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1315) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1340) initiates the 32 Bit API DLL, which collects all registry data on the HKEY_LOCAL_MACHINE:Software\Microsoft registry segment. The other functions in FIG. 13 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 14:
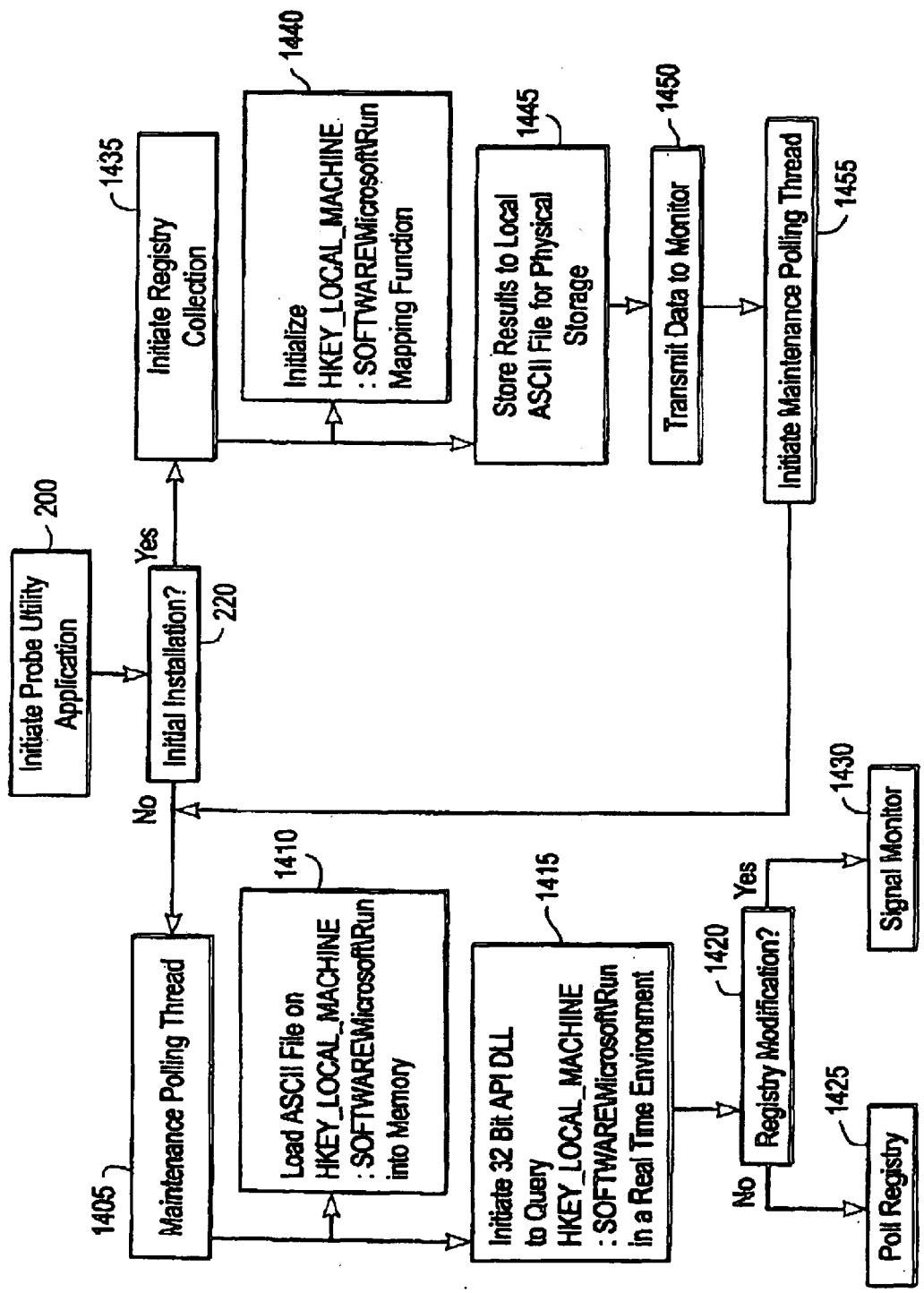
FIG. 14 is a flow diagram of a process for automatically detecting any unauthorized modification of the HKEY_LOCAL_MACHINE:Software\Microsoft\Run registry segment in a real time environment.

Reference is now made to FIG. 14 for purposes of discussing additional functional mechanics of the client application 110 in accordance with an embodiment of the present invention. In particular, FIG. 14 is a flow diagram of a process for automatically detecting any unauthorized modification of the HKEY_LOCAL_MACHINE: Software\Microsoft\Run registry segment in a real time environment.

After the collection of all internal registry data is transmitted to the monitor station 115, the PC Probe in the client application 110 initiates an additional parallel threaded function designed and developed by the inventor, which initiates an additional independent 21 API DLL designed and developed by the inventor, which performs an analysis on the HKEY_LOCAL_MACHINE:Software\Microsoft\ Run segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1415) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1440) initiates the 32 Bit API DLL, which collects all registry data on the HKEY_LOCAL_MACHINE:Software\Microsoft\ Run registry segment. The other functions in FIG. 14 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 15:
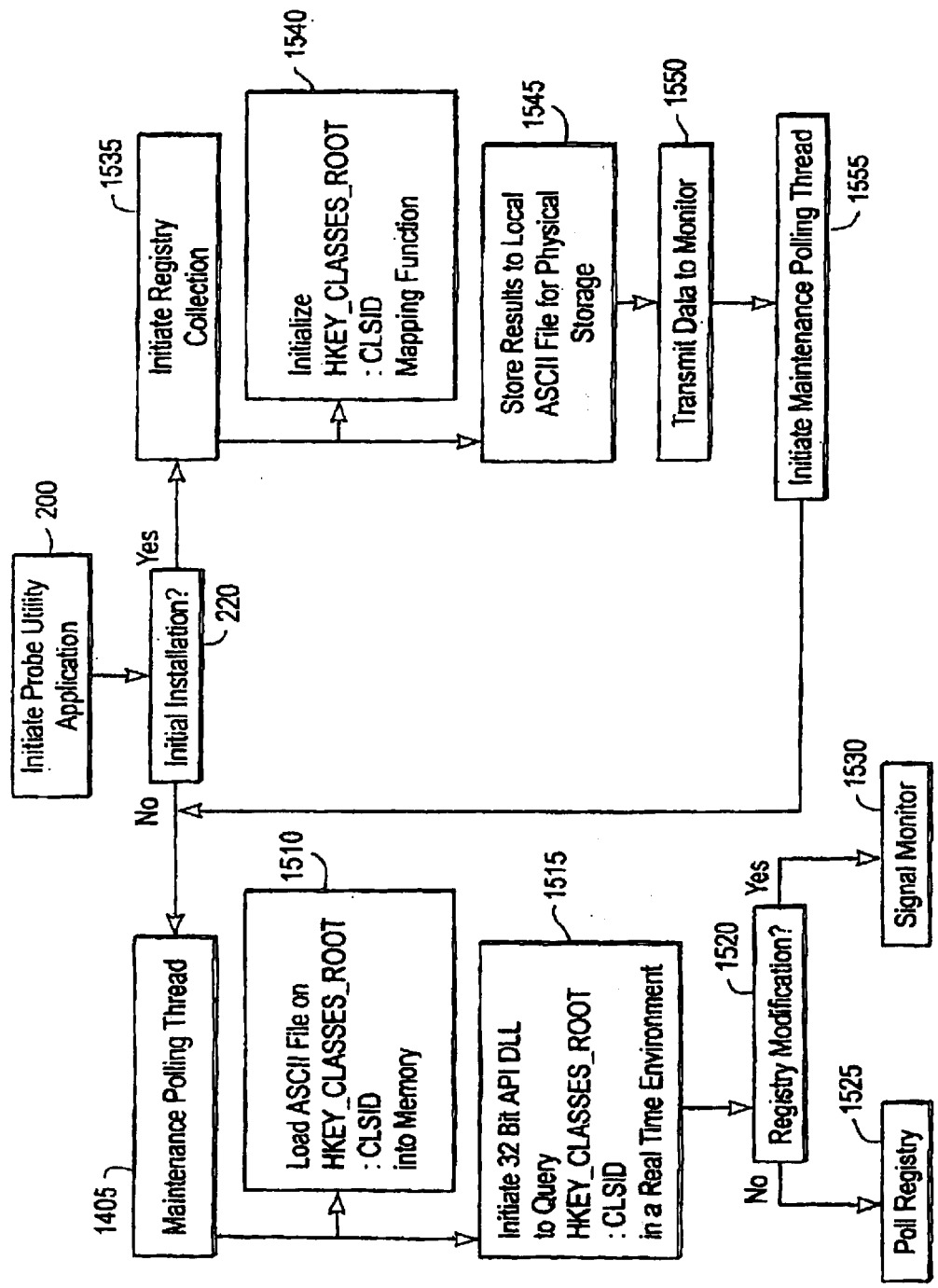
FIG. 15 is a flow diagram of a process for automatically detecting any unauthorized modification of the HKEY_CLASSS_ROOT:CLSID registry segment in a real time environment.

Reference is now made to FIG. 15 for purposes of discussing additional functional mechanics of the client application 110 in accordance with an embodiment of the present invention. In particular, FIG. 15 is a flow diagram of a process for automatically detecting any unauthorized modification of the HKEY_CLASSS_ROOT:CLSID registry segment in a real time environment.

After the collection of all internal registry data is transmitted to the monitor station 115, the PC Probe initiates an additional parallel threaded function designed and developed by the inventor, which initiates an additional independent 21 API DLL designed and developed by the inventor, which performs an analysis on the HKEY_CLASSES_ROOT:CLSID segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1515) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1540) initiates the 32 Bit API DLL, which collects all registry data on the HKEY_CLASSES_ROOT:CLSID registry segment. The other functions in FIG. 15 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 16:
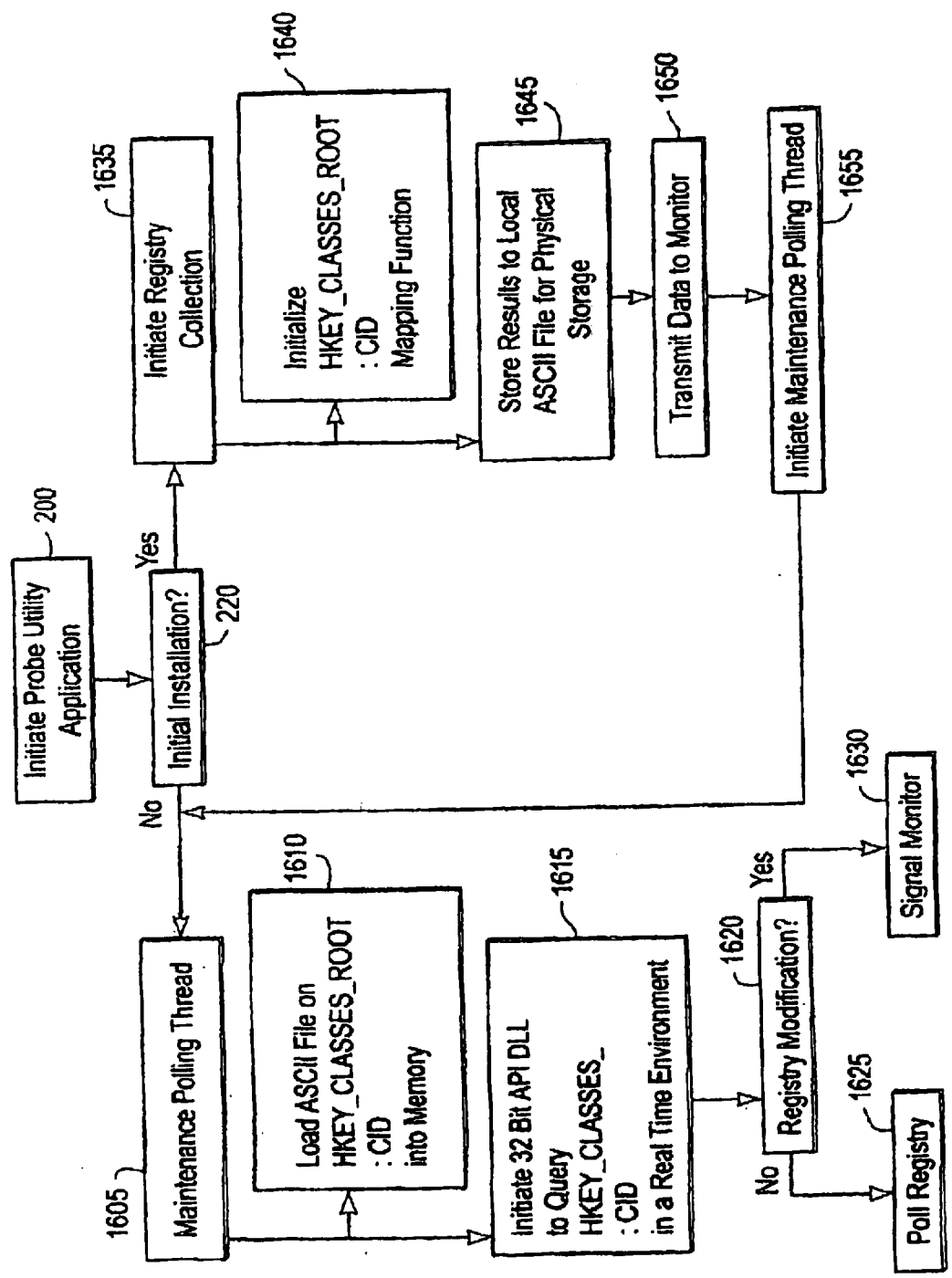
FIG. 16 is a flow diagram of a process for automatically detecting any unauthorized modification of the HKEY_CLASSES_ROOT:CID registry segment (if present), in a real time environment.

Reference is now made to FIG. 16 for purposes of discussing additional functional mechanics of the client application 110 in accordance with an embodiment of the present invention. In particular, FIG. 16 is a flow diagram of a process for automatically detecting any unauthorized modification of the HKEY_CLASSES_ROOT:CID registry segment (if present), in a real time environment.

After the collection of all internal registry data is transmitted to the monitor station 115, the PC Probe initiates an additional parallel threaded function designed and developed by the inventor, which initiates an additional independent 21 API DLL designed and developed by the inventor, which performs an analysis on the HKEY_CLASSES_ROOT:CID segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1615) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1640) initiates the 32 Bit API DLL, which collects all registry data on the HKEY_CLASSES_ROOT:CID registry segment. The other functions in FIG. 16 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates it's count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 17:
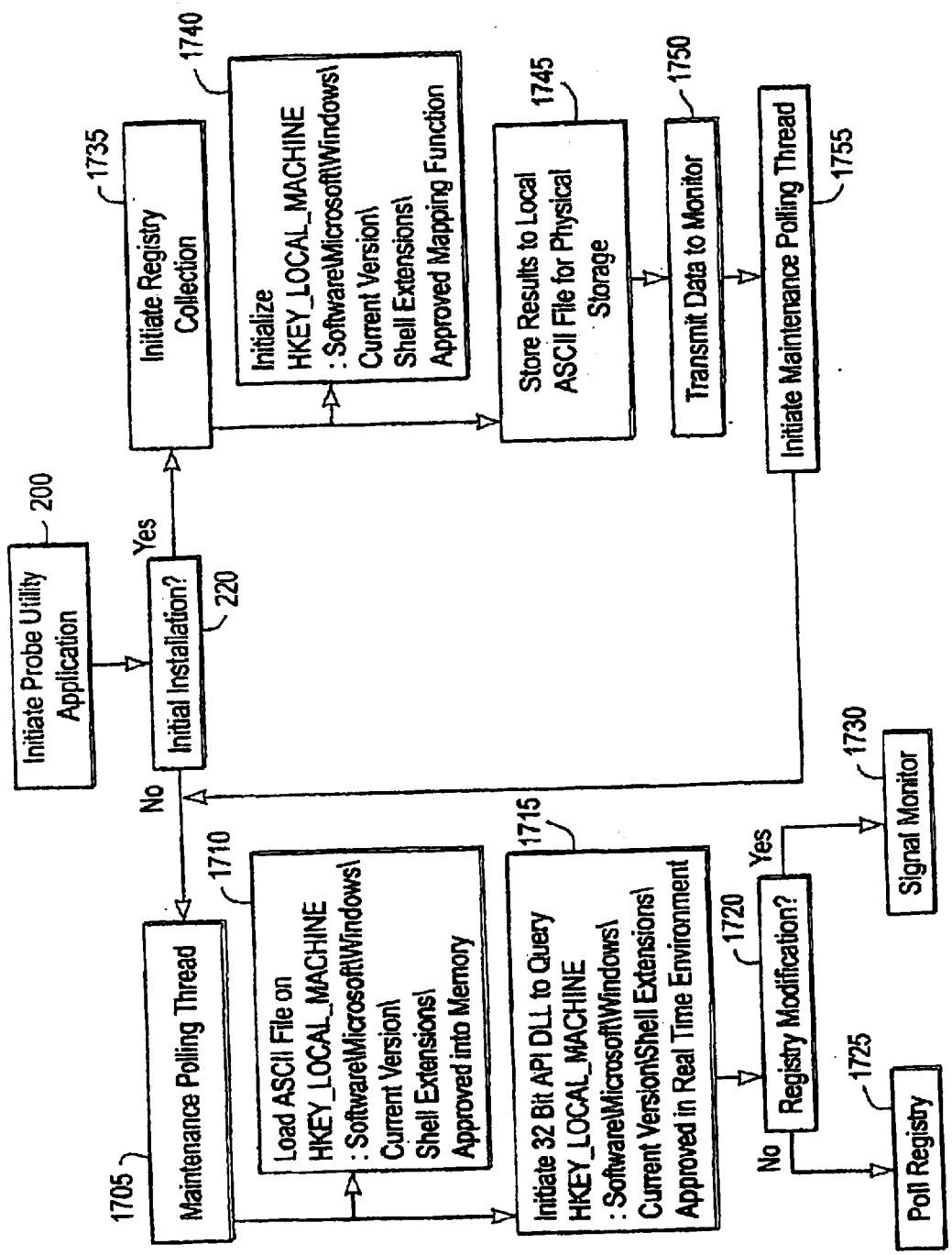
FIG. 17 is a flow diagram of a process for automatically detecting any unauthorized modification of the HKEY_LOCAL_MACHINE:Software\Microsoft\Windows\CurrentVersion\ShellExtensions\Approved registry segment in a real time environment.

Reference is now made to FIG. 17 for purposes of discussing additional functional mechanics of the client application 115 in accordance with an embodiment of the present invention. In particular, FIG. 17 is a flow diagram of a process for automatically detecting any unauthorized modification of the HKEY_LOCAL_MACHINE:Software\Microsoft\Windows\CurrentVersion\ShellExtensions\Approved registry segment in a real time environment.

After the collection of all internal registry data is transmitted to the monitor station 115, the PC Probe initiates an additional parallel threaded function designed and developed by the inventor, which initiates an additional independent 21 API DLL designed and developed by the inventor, which performs an analysis on the HKEY_LOCAL_MACHINE:Software\Microsoft\Windows\CurrentVersion\ShellExtensions\Approved segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1715) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1740) initiates the 32 Bit API DLL, which collects all registry data on the HKEY_LOCAL_MACHINE:Software\Microsoft\Windows\CurrentVersion\ShellExtensions\Approved registry segment. The other functions in FIG. 17 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 18:
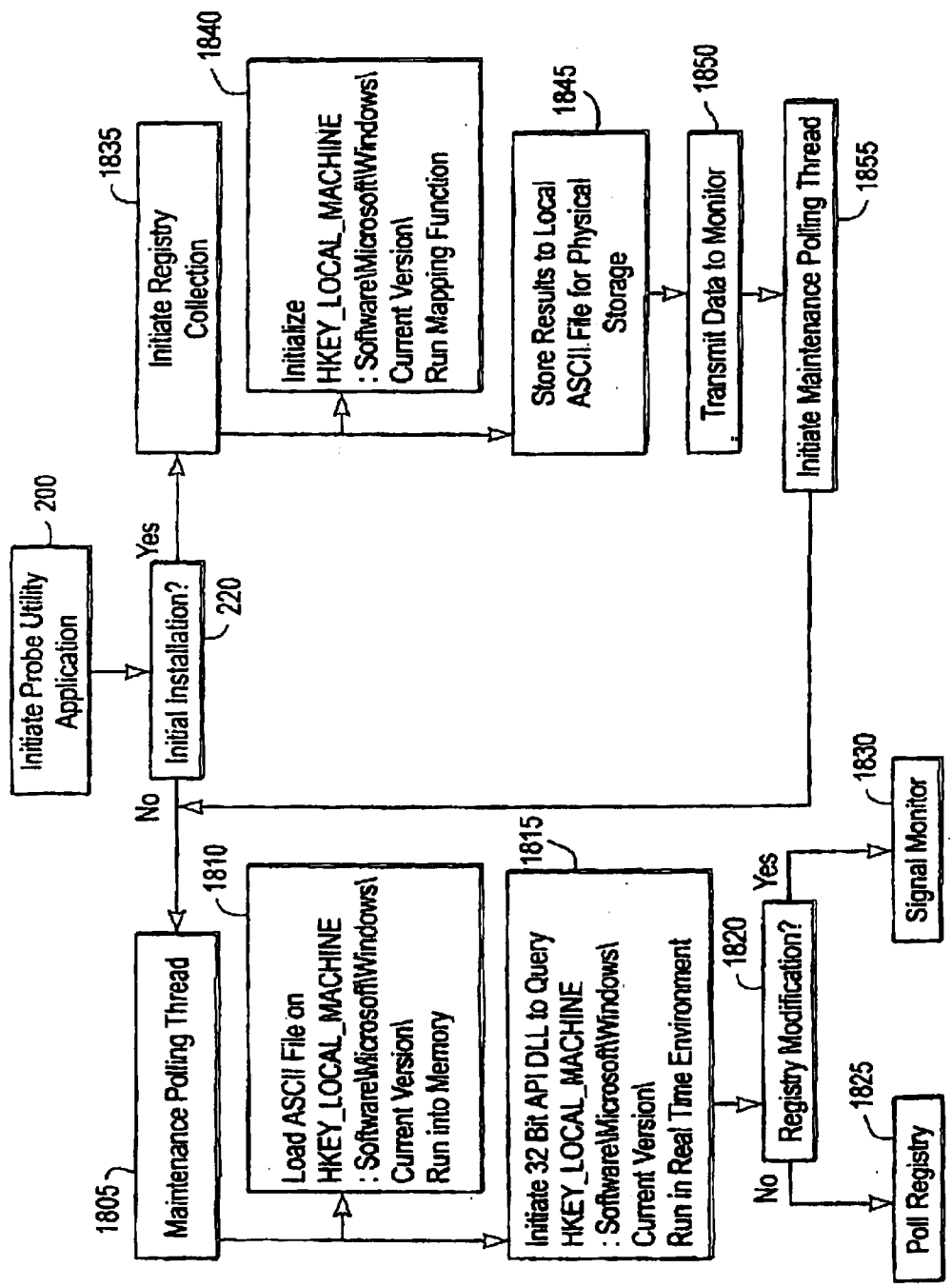
FIG. 18 is a flow diagram of a process for automatically detecting any unauthorized modification of the HKEY_LOCAL_MACHINE:Software\Microsoft\Windows\CurrentVersion\Run registry segment in a real time environment.

Reference is now made to FIG. 18 for purposes of discussing additional functional mechanics of the client application 110 in accordance with an embodiment of the present invention. In particular, FIG. 18 is a flow diagram of a process for automatically detecting any unauthorized modification of the HKEY_LOCAL_MACHINE: Software\Microsoft\Windows\CurrentVersion\Run registry segment in a real time environment.

After the collection of all internal registry data is transmitted to the monitor station 115, the PC Probe initiates an additional parallel threaded function designed and developed by the inventor, which initiates an additional independent 21 API DLL designed and developed by the inventor, which performs an analysis on the HKEY_LOCAL_MACHINE:Software\Microsoft\Windows\CurrentVersion\Run segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1815) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1840) initiates the 32 Bit API DLL, which collects all registry data on the HKEY_LOCAL_MACHINE:Software\Microsoft\ Windows\CurrentVersion\Run registry segment. The other functions in FIG. 18 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 19:
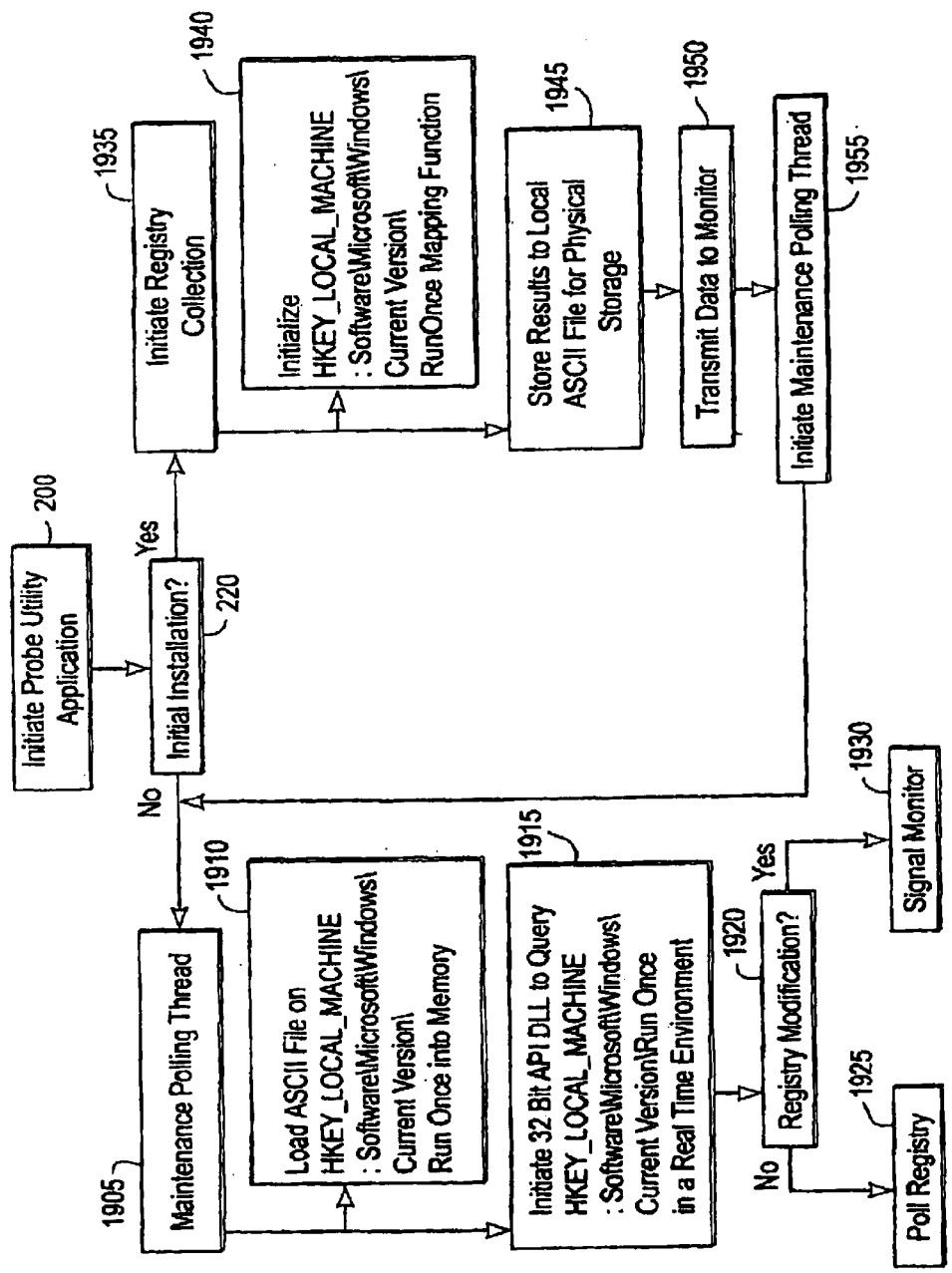
FIG. 19 is a flow diagram of a process for automatically detecting any unauthorized modification of the HKEY_LOCAL_MACHINE:Software\Microsoft\Windows\Currentversion\RunOnce registry segment in a real time environment.

Reference is now made to FIG. 19 for purposes of discussing the functional mechanics of the client application in accordance with an embodiment of the present invention. In particular, FIG. 19 is a flow diagram of a process for automatically detecting any unauthorized modification of the HKEY_LOCAL_MACHINE:Software\Microsoft\ Windows\CurrentVersion\RunOnce registry segment in a real time environment.

After the collection of all internal registry data is transmitted to the monitor station 115, the PC Probe initiates an additional parallel threaded function designed and developed by the inventor, which initiates an additional independent 21 API DLL designed and developed by the inventor, which performs an analysis on the HKEY_LOCAL_ MACHINE:Software\Microsoft\Windows\CurrentVersion\ RunOnce segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 1915) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 1940) initiates the 32 Bit API DLL, which collects all registry data on the HKEY_LOCAL_MACHINE:Software\Microsoft\ Windows\CurrentVersion\RunOnce registry segment. The other functions in FIG. 19 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 20:
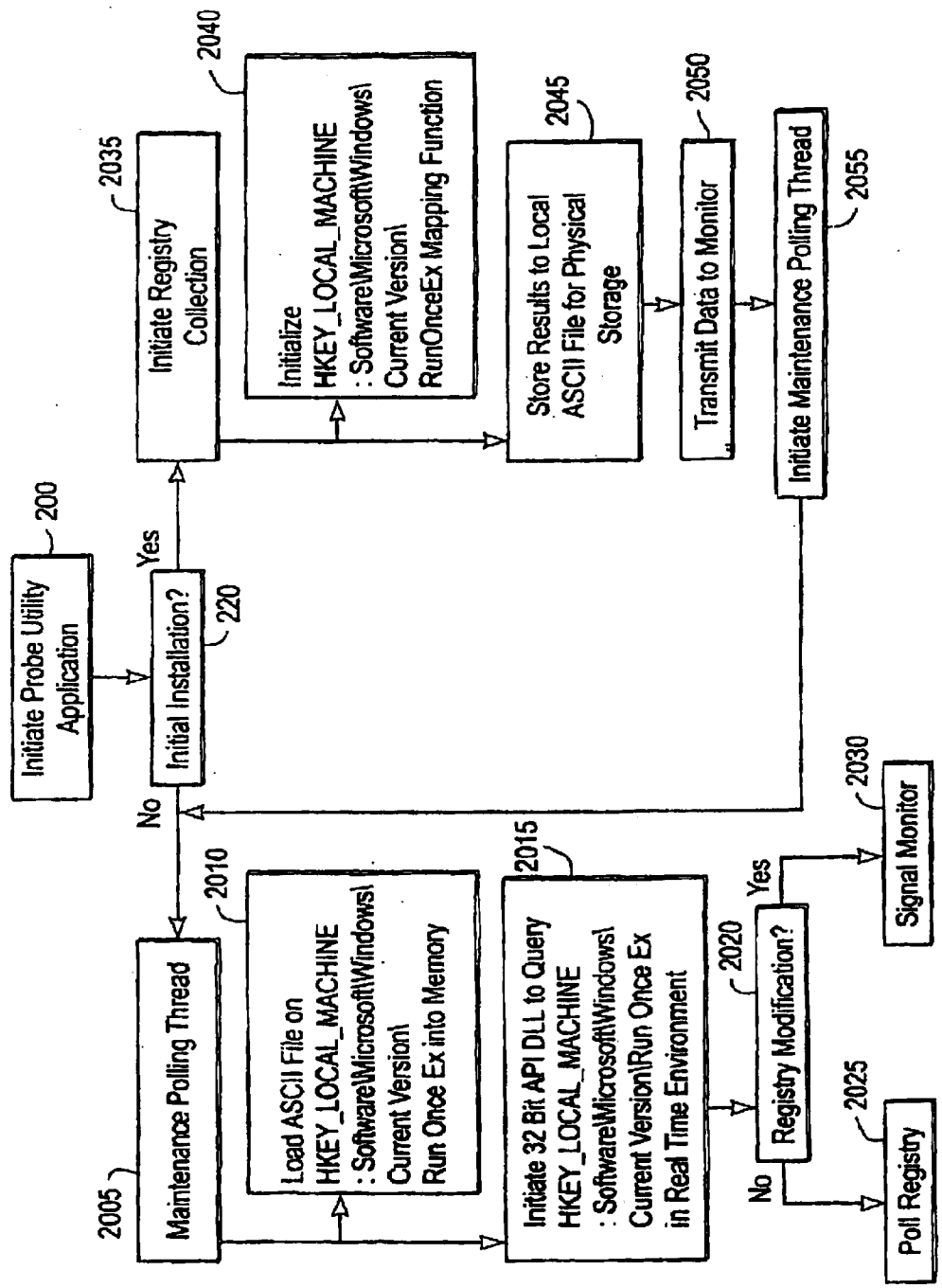
FIG. 20 is a flow diagram of a process for automatically detecting any unauthorized modification of the HKEY_LOCAL_MACHINE:Software\Microsoft\Windows\Currentversion\RunOnceEx registry segment in a real time environment.

Reference is now made to FIG. 20 for purposes of discussing the functional mechanics of the client application 110 in accordance with an embodiment of the present invention. In particular, FIG. 20 is a flow diagram of a process for automatically detecting any unauthorized modification of the HKEY_LOCAL_MACHINE:Software\ Microsoft\Windows\CurrentVersion\RunOnceEx registry segment in a real time environment.

After the collection of all internal registry data is transmitted to the monitor station 115, the Probe initiates an additional parallel threaded function designed and developed by the inventor, which initiates an additional independent 32 Bit API DLL designed and developed by the inventor, which performs an analysis on the HKEY_ LOCAL_MACHINE:Software\Microsoft\Windows\ CurrentVersion\RunOnceEx segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 2015) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 2040) initiates the 32 Bit API DLL, which collects all registry data on the HKEY_LOCAL_MACHINE:Software\Microsoft\Windows\CurrentVersion\RunOnceEx registry segment. The other functions in FIG. 20 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 21:
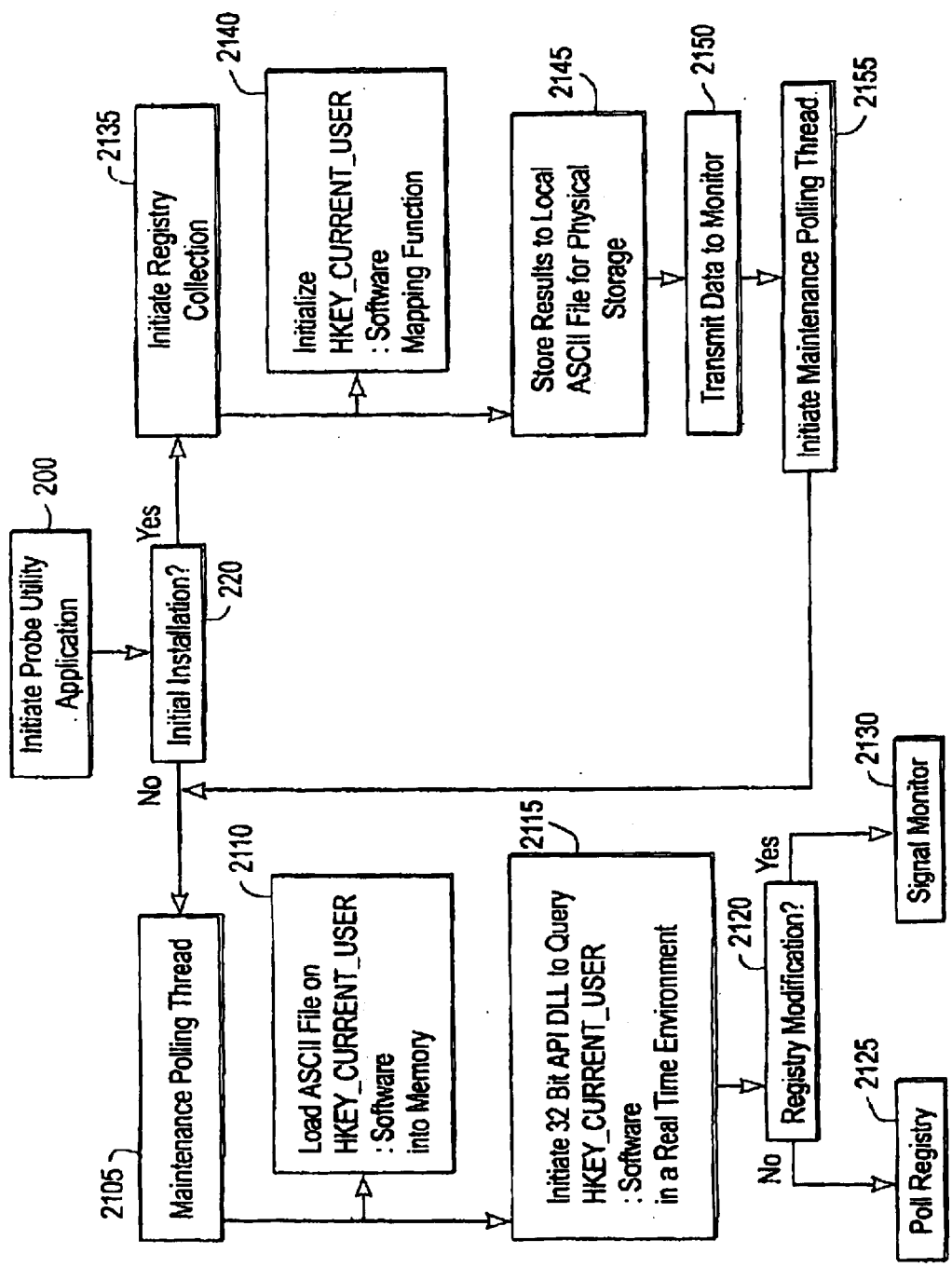
FIG. 21 is a flow diagram of a process for automatically detecting any unauthorized modification of the HKEY_CURRENT_USER:Software registry segment in a real time environment.

Reference is now made to FIG. 21 for purposes of discussing additional functional mechanics of the client application 110 in accordance with an embodiment of the present invention. In particular, FIG. 21 is a flow diagram of a process for automatically detecting any unauthorized modification of the HKEY_CURRENT_USER:Software registry segment in a real time environment.

After the collection of all internal registry data is transmitted to the monitor station 115, the PC Probe initiates an additional parallel threaded function designed and developed by the inventor, which initiates an additional independent 32 Bit API DLL designed and developed by the inventor, which performs an analysis on the HKEY_CURRENT_USER:Software segment of the internal registry. This analysis includes a method opening the physical registry key and opening and querying this segment for any possible unauthorized changes within this particular area of the registry. The method includes establishing a "base count" of all authorized entries within this particular segment of the registry. After the "base count" is established, a numeric integer of the "base count" is stored in RAM. The MFC parallel thread then initiates a 32 BIT API designed and developed by the inventor, which initiates an algorithm that calculates if any change has occurred to the "base count" of this particular defined segment of the registry.

The MFC parallel thread (block 2115) then initiates the 32 BIT API designed and developed by the inventor, which initiates an algorithm that calculates if any change has occurred to the "base count" of this particular defined segment of the registry. The actual function of the 32 bit API design is described further below. A sub-thread (block 2140) initiates the 32 Bit API DLL, which collects all registry data on the HKEY_CURRENT_USER:Software registry segment. The other functions in FIG. 21 perform as similarly described in the previous drawings for corresponding similar functions.

The algorithm method designed by the inventor queries the defined segment of the registry in such a way, where virtually no resource utilization is registered within the CPU. This is possible, because within the defined segment of the registry, entries are listed in no particular order and are random in nature.

While, the actual O/S has to query the each registry segment within its entirety to establish and maintain its program environment, the method designed and developed by the inventor, is an algorithm which calculates the maximum "base count" (integer) for all entries within this defined registry segment, less the "base count" minus 2. The "base count" minus 2, equates to the start position pointer in which the algorithm continues to count the remaining entries and the last "date-time modification" within this particular defined portion of the registry segment.

When the algorithm initiates its count at the start position pointer, the algorithm will proceed to count the remaining entries within the defined segment of the registry. If the maximum count equation does not equal the pre-calculated results, the defined registry segment has been violated by a manual edit from the user or by modification from an unauthorized program.

The pre-calculated results guarantees 100% accurate results from the query, because the algorithm is designed to query the defined segment every about five to eight seconds. The speed of the query makes it impossible for a user to delete and add a new entry to the defined segment, without being intercepted by the algorithm. Furthermore, unauthorized programs perform a calculation to add entries to a defined area of the registry, which makes the algorithm designed by the inventor 100% accurate against unauthorized program activity.

Figure 22:
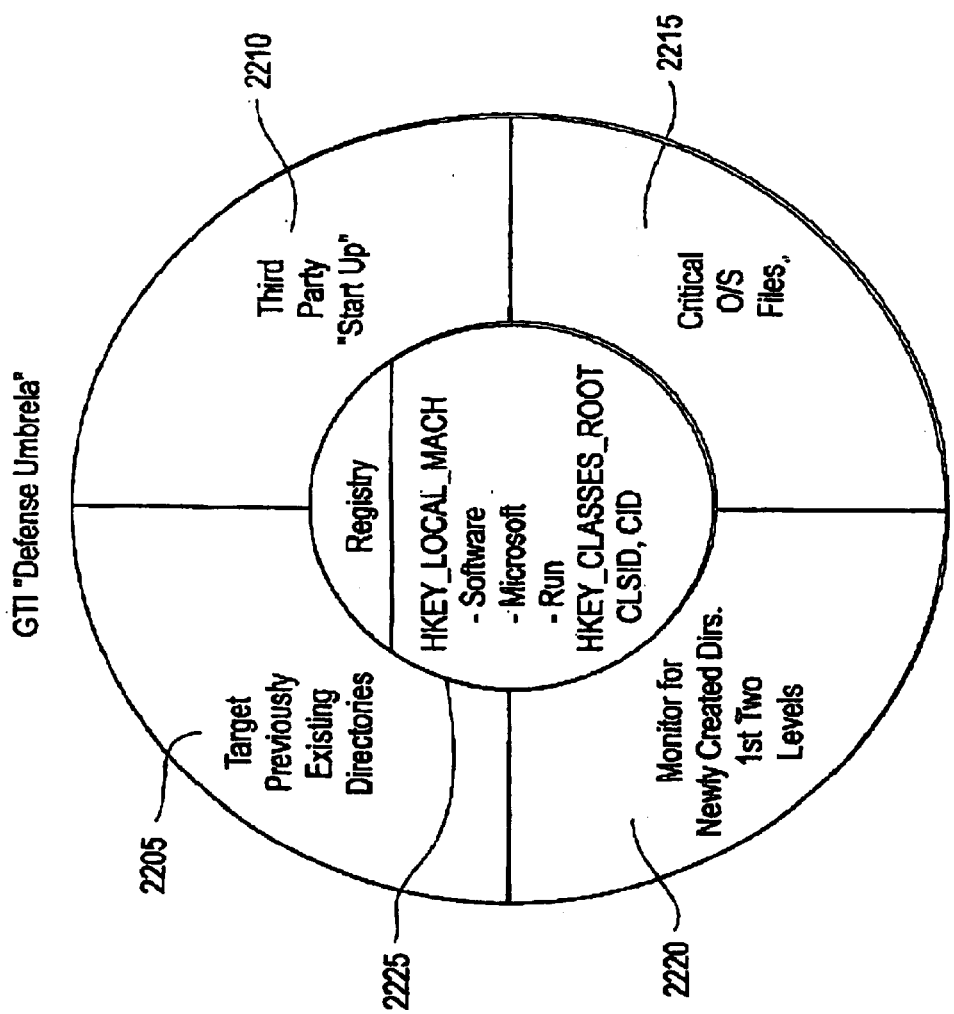
FIG. 22 is a block diagram illustrating various methods utilized to initiate a "defense umbrella" of the entire PC desktop environment.

Reference is now made to FIG. 22 for purposes of discussing addition functional mechanics of the client application 110 in accordance with an embodiment of the present invention. In particular, FIG. 22 is a block diagram illustrating various methods utilized to initiate a "defense umbrella" of the entire PC desktop environment.

The parallel threads and all 32 Bit API DLLs designed and developed by the inventor, working together within the client application 110, envelope a "defense umbrella" or "immune system" over the entire PC client computer environment.

The client application 110, constantly polls and queries every major critical segment of the client computer, from the configuration of the O/S files (2215), the third-party "start up" (2210), the creation of new directories or folders (2220), the creation of new programs and maintaining the configuration of the computer registry (2205). The registry 2225 was also discussed above in various sections.

Further, at least some of the components of this invention may be implemented by using a programmed general purpose digital computer, by using application specific integrated circuits or field programmable gate arrays, or by using a network of interconnected components and circuits. Connections may be wired, wireless, by modem, and the like.

It is also within the scope of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system of real time monitoring and control of networked computers, comprising:
    a monitoring computer unit capable of being communicatively coupled to a network system; and
    a client computer unit capable of being communicatively coupled to the network system, the client computer including a client application that can detect states in the client computer and transmit the detected states to the monitoring computer unit via the network system to permit detection of an unauthorized software program or unauthorized behavior within the client computer unit, wherein the detection of the states includes calculating a maximum base count for entries in a defined registry segment in an internal registry in the client computer unit, and wherein the client application detects states in the client computer by detecting a modification of registry configuration data in the internal registry in the client computer unit.

2. The system of claim 1 wherein the monitoring computer unit includes an administrator application capable to analyze the transmitted detected states.

3. The system of claim 2 wherein the administrator application is capable to issue command signal to control the client computer unit in response to a particular detected state in the client computer unit.

4. A method of real time monitoring and control of networked computers, comprising:
    providing a monitoring computer unit and client computer unit both capable of being communicatively coupled to a network system; and
    detecting states in the client computer unit and transmitting the detected states to the monitoring computer unit via the network system to permit detection of an unauthorized software program or unauthorized behavior within the client computer unit, wherein the detection of the states includes calculating a maximum base count for entries in a defined registry segment in an internal registry in the client computer unit, and detecting the states in the client computer unit comprises detecting a modification of registry configuration data in the internal registry in the client computer unit.

5. The system of claim 1, wherein the internal registry comprises a database that is used by an operating system in order to store configuration information.

6. The system of claim 1, wherein the client application retrieves the registry configuration data and stores the registry configuration data into a memory array, prior to detecting a modification of the registry configuration data.

7. The system of claim 1, wherein the client application detects states in the client computer by detecting a modification of internal directory information and file information in the client computer.

8. The system of claim 7, wherein the client application retrieves the internal directory information and file information and stores the internal directory information and file information into a memory array, prior to detecting a modification of the internal directory information and file information.

9. The system of claim 1, wherein the internal directory information and file information are required to initiate a third-party application program.

10. The system of claim 1, wherein the internal directory information and file information are required to initiate the computer unit and the programs for initializing a third-party application program.

11. The system of claim 1, wherein the client application intercepts messages generated between an operating system and a third-party application program, in order to determine if an action by a user of the client computer is authorized.

12. The system of claim 11, wherein the client application monitors and intercepts the messages between the operating system and a third-party application program by accessing a memory buffer.

13. The method of claim 4, wherein the internal registry comprises a database that is used by an operating system in order to store configuration information.

14. The method of claim 4, further comprising:
    analyzing, by the monitoring computer unit, the transmitted detected states that are transmitted by the client computer unit.

15. The method of claim 4, further comprising:
    issuing, by the monitoring computer unit, a command signal to control the client computer unit in response to a particular detected state in the client computer unit.

16. The method of claim 4, further comprising:
    prior to detecting a modification of the registry configuration data, retrieving the registry configuration data, and storing the registry configuration data into a memory array.

17. The method of claim 4, further comprising:
    detecting a modification of internal directory information and file information in the client computer unit.

18. The method of claim 17, further comprising:
    retrieving the internal directory information and file information, and storing the internal directory information and file information into a memory array, prior to detecting a modification of the internal directory information and file information.

19. The method of claim 4, further comprising:
    intercepting messages generated between an operating system and a third-party application program, in order to determine if an action by a user of the client computer unit is authorized.

20. The method of claim 19, wherein the act of intercepting the messages between the operating system and a third-party application program comprises accessing a memory buffer.

* * * * *